United States Patent [19]

Imai et al.

[11] Patent Number: 4,958,314

[45] Date of Patent: Sep. 18, 1990

[54] INFORMATION RECORDING/REPRODUCING APPARATUS

[75] Inventors: Yoshihiko Imai, Hirakata; Yoshio Nakano, Takatsuki; Makoto Ando, Itami; Yoshiyuki Iwamura, Ibaraki; Takashi Ishida, Kadoma, all of Japan

[73] Assignee: Matsushita Electric Industrial Co., Ltd., Osaka, Japan

[21] Appl. No.: 13,407

[22] Filed: Feb. 11, 1987

[30] Foreign Application Priority Data

Feb. 18, 1986 [JP] Japan .................. 61-34527
Feb. 18, 1986 [JP] Japan .................. 61-34528
Jun. 20, 1986 [JP] Japan .................. 61-145102

[51] Int. Cl.⁵ .......................................... G11B 19/02
[52] U.S. Cl. .................................. 364/900; 364/968.0; 364/970.1; 364/952.1; 364/959.3; 369/59; 369/32
[58] Field of Search .............. 369/59, 54, 32, 14, 369/15; 364/200 MS File, 900 MS File

[56] References Cited

U.S. PATENT DOCUMENTS

| | | | |
|---|---|---|---|
| 4,519,056 | 5/1985 | Kimoto et al. | 369/43 |
| 4,546,462 | 10/1985 | Koishi et al. | 369/53 |
| 4,630,140 | 12/1986 | Sugimura et al. | 360/49 |
| 4,638,472 | 1/1987 | Ogata et al. | 369/54 |
| 4,642,703 | 2/1987 | Endo | 358/342 |
| 4,660,100 | 4/1987 | Sugiyama et al. | 358/342 |
| 4,677,606 | 6/1987 | Ogata et al. | 369/59 |
| 4,682,318 | 7/1987 | Busby | 369/59 |
| 4,695,993 | 9/1987 | Takagi et al. | 369/54 |
| 4,734,901 | 3/1988 | Murakami | 369/59 |
| 4,742,404 | 5/1988 | Yunoki | 360/66 |
| 4,760,566 | 7/1988 | Kobayashi et al. | 369/48 |

OTHER PUBLICATIONS

Robbins, J., Mastering DOS: The Complete Tutorial and Up-To-Date User's, Guide, San Francisco, Sybex Inc., 1988, pp. 438–441.

Primary Examiner—Gareth D. Shaw
Assistant Examiner—Marie Napeorkowski
Attorney, Agent, or Firm—Stevens, Davis, Miller & Mosher

[57] ABSTRACT

An information recording/reproducing apparatus for an information storage medium comprising sectors each having a data area composed of a read-only data area and a writable data area. Data in the read-only data area are formed through pressing or the like, and when the data in the read-only data area are to be renewed, renewed data are recorded in the writable data area so that it is made possible to form a large quantity of correctable read-only data.

9 Claims, 23 Drawing Sheets

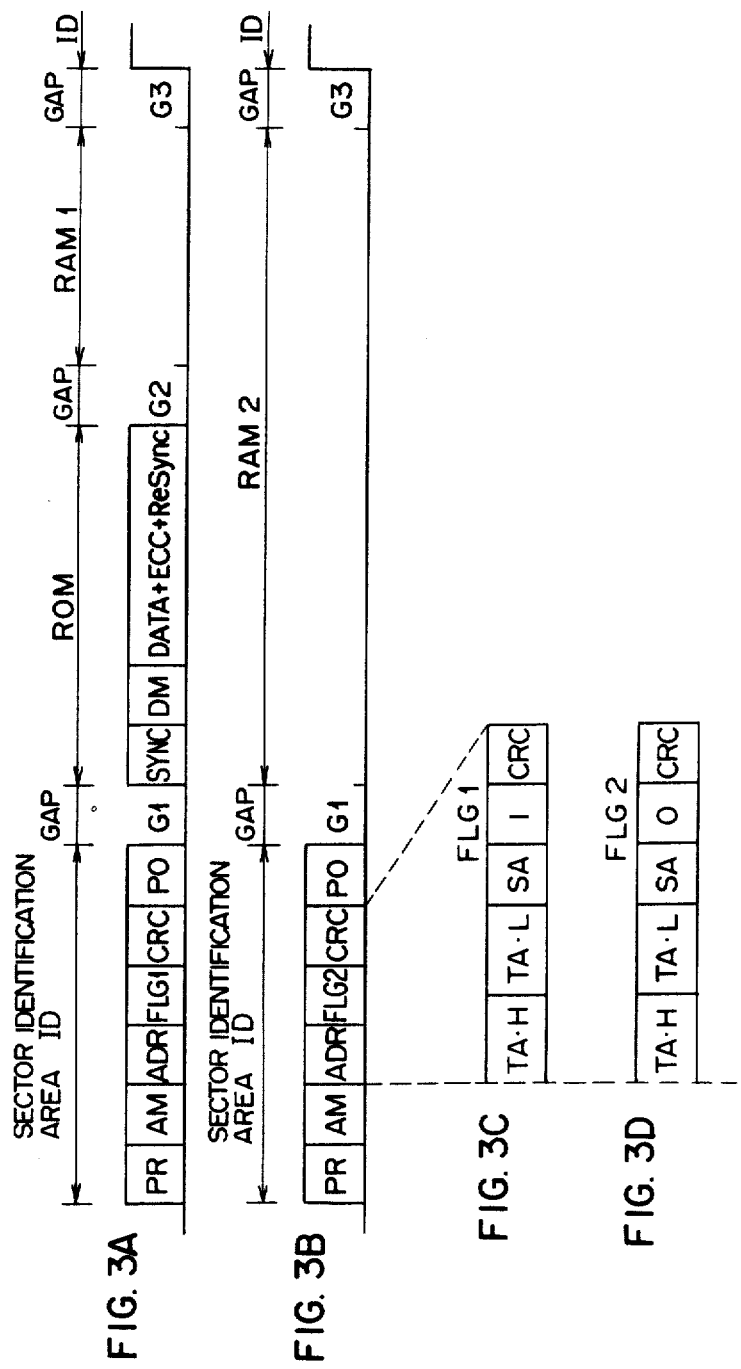

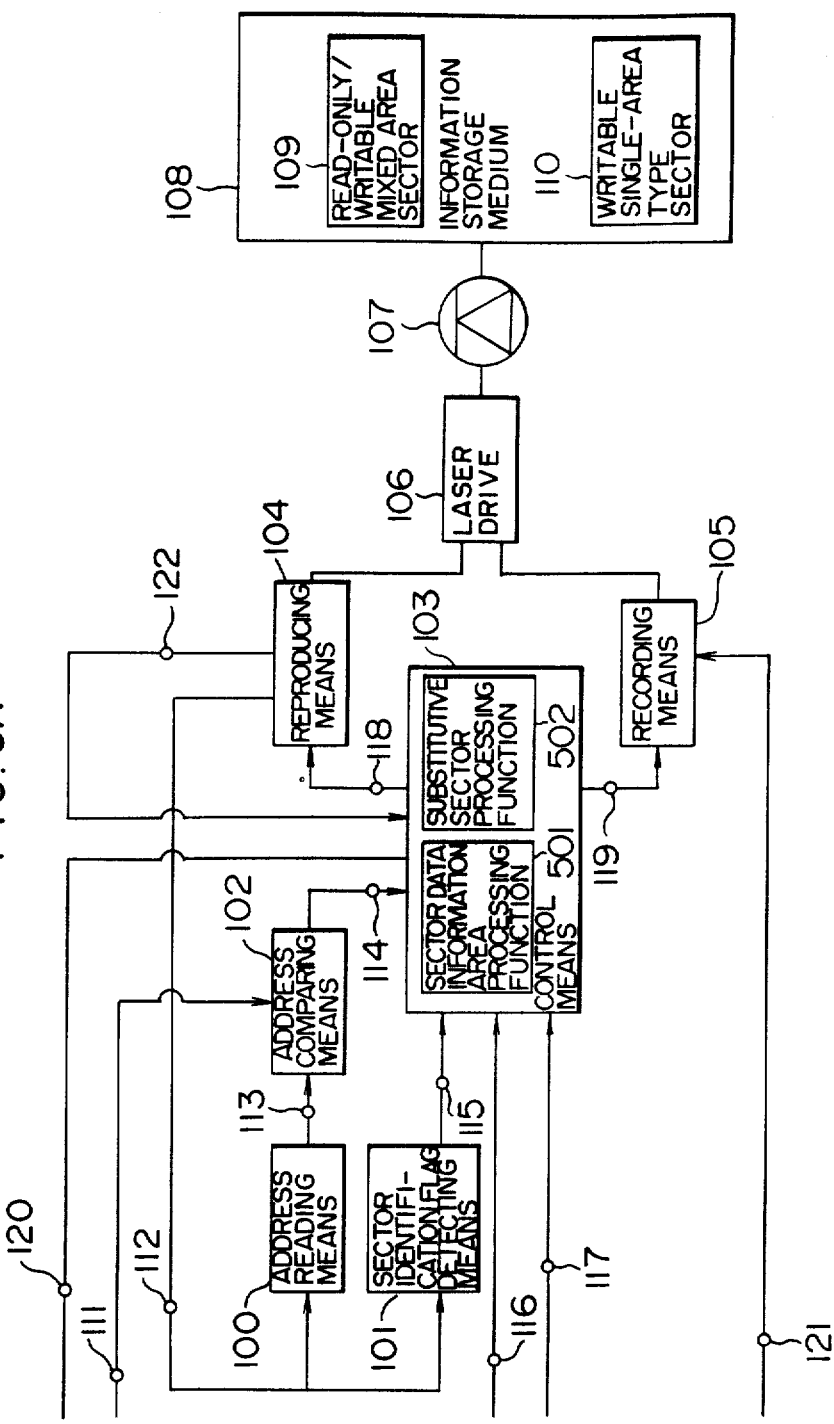

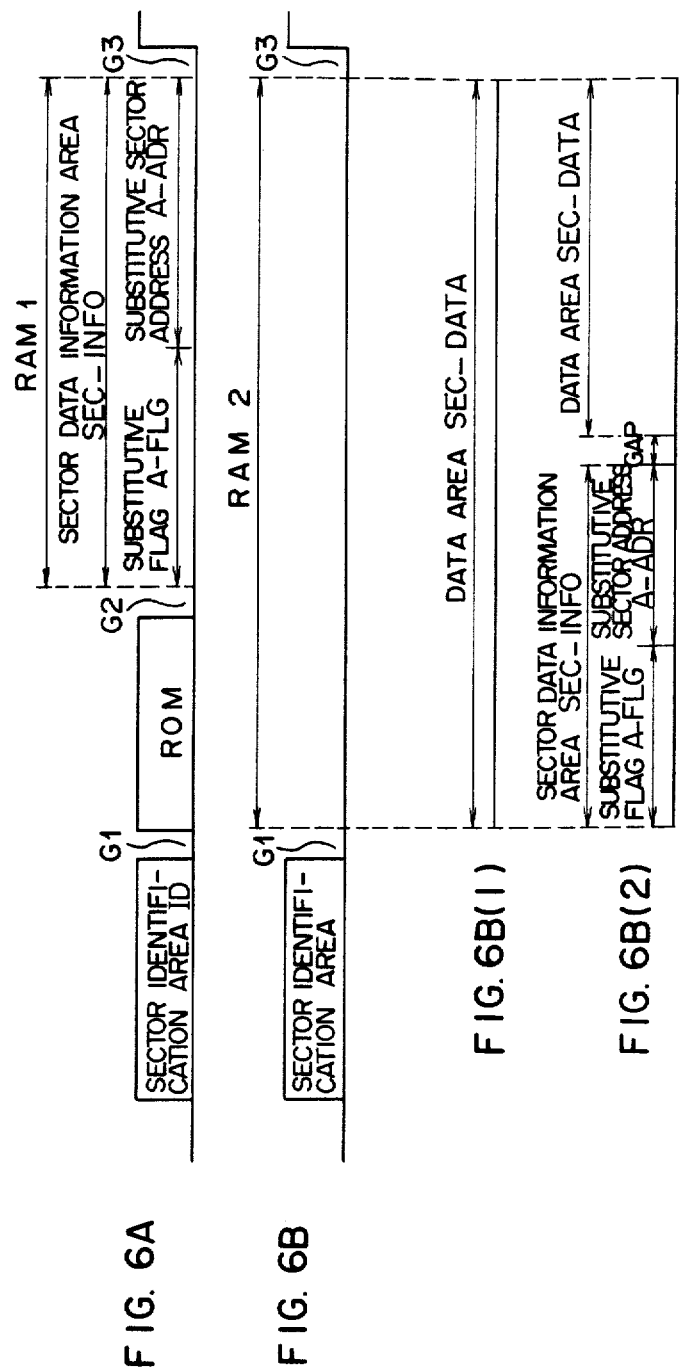

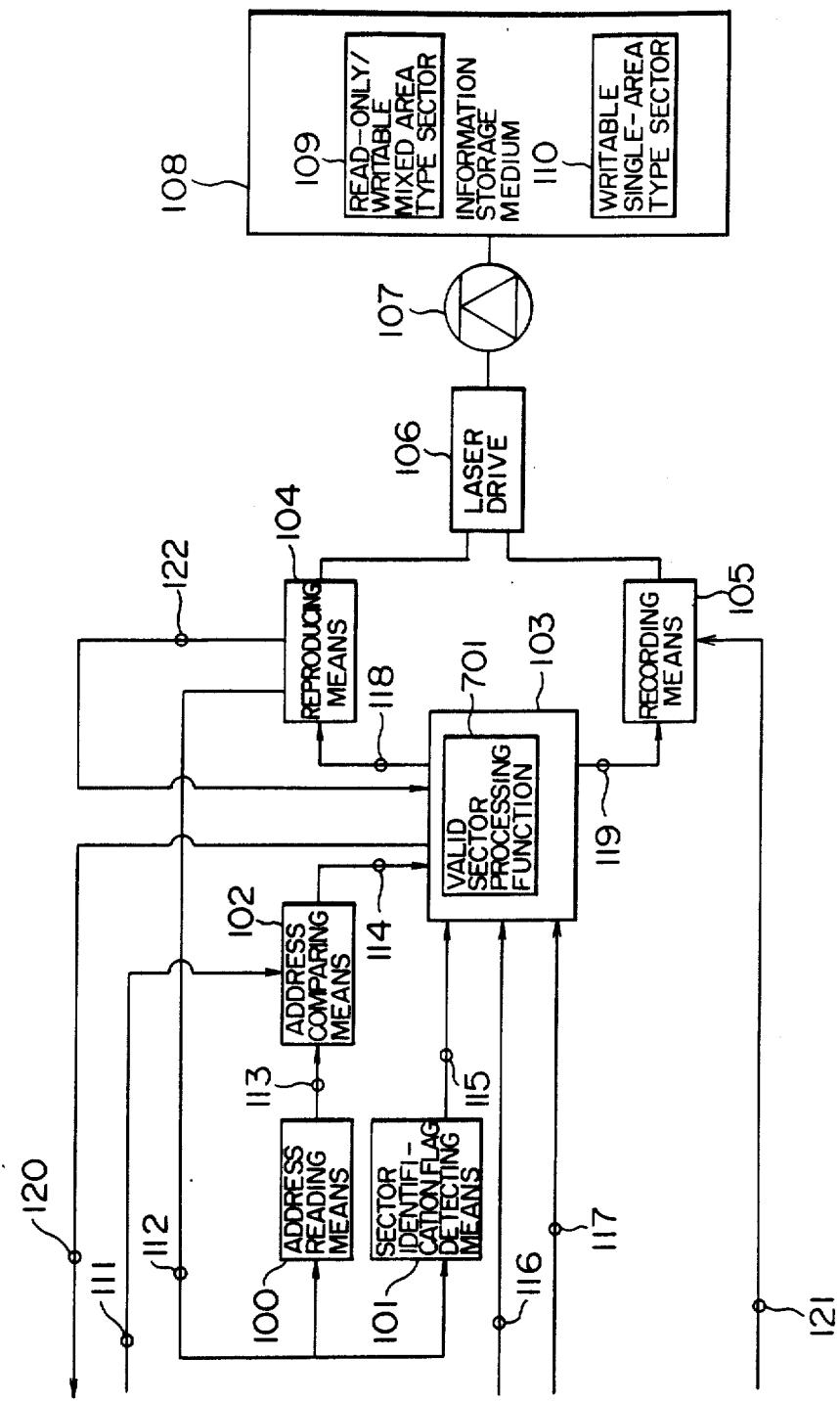

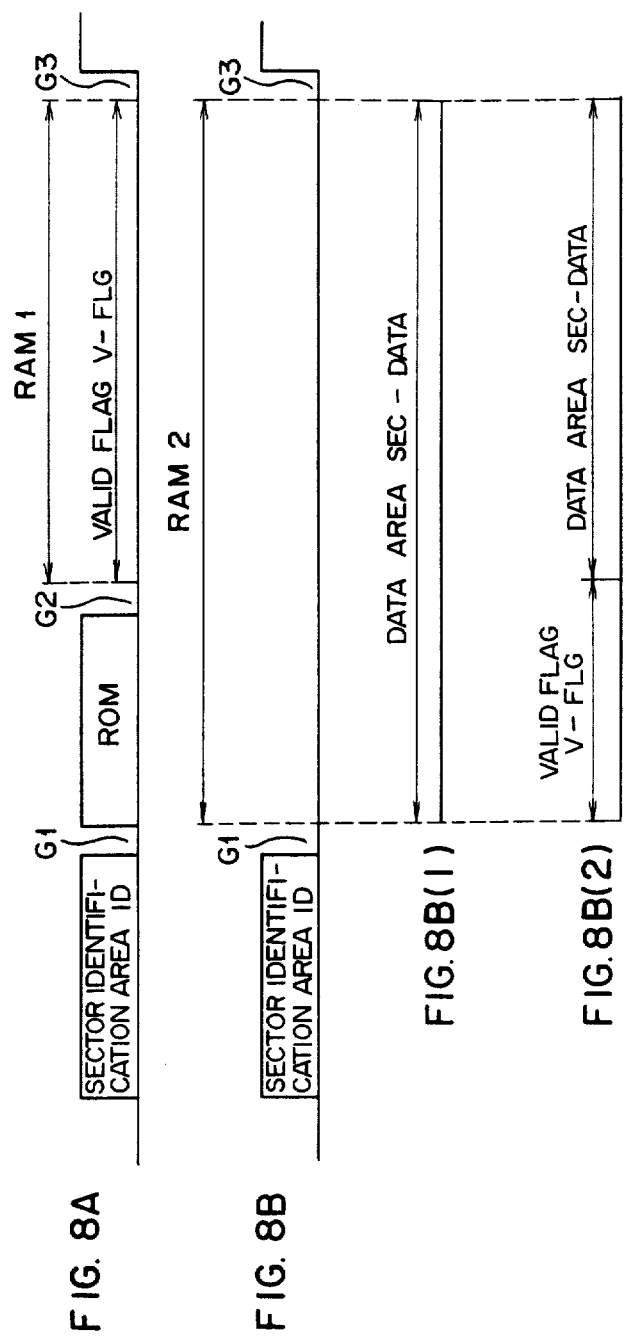

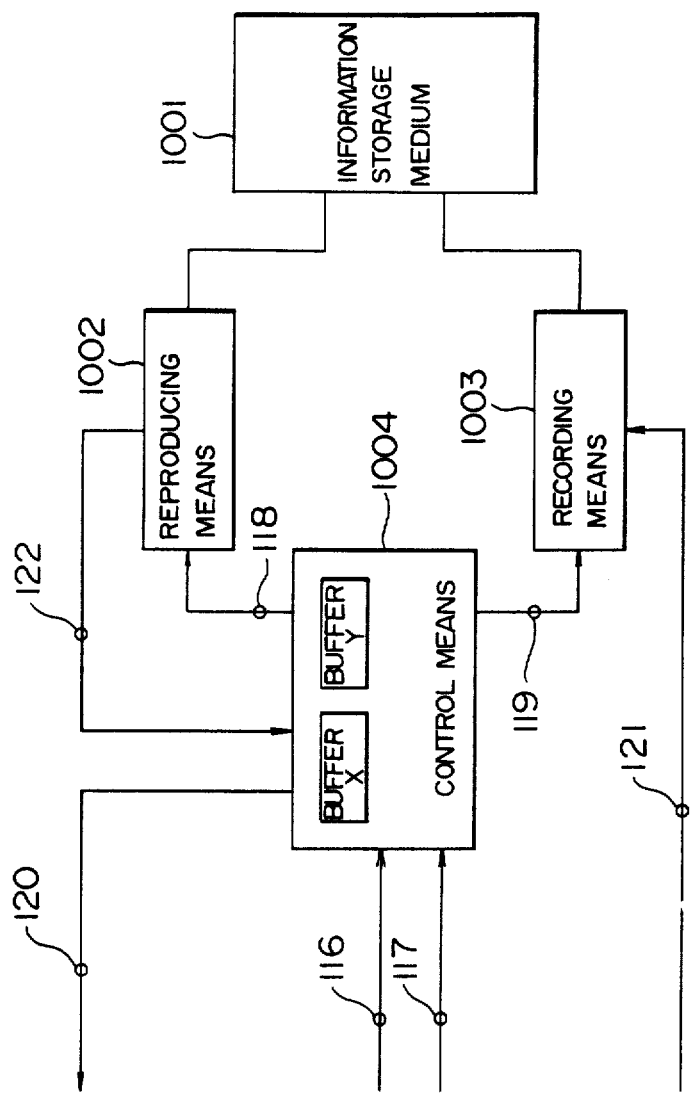
F I G. 9

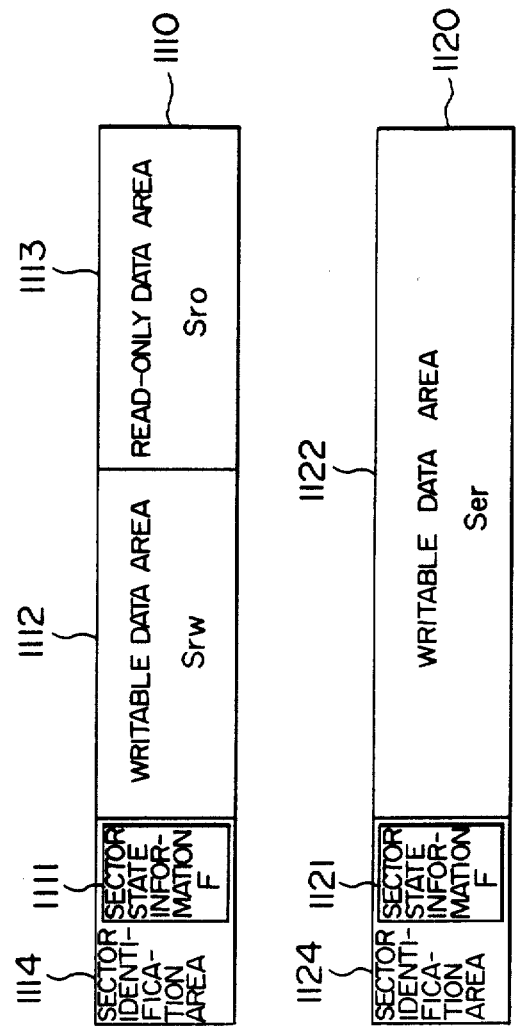

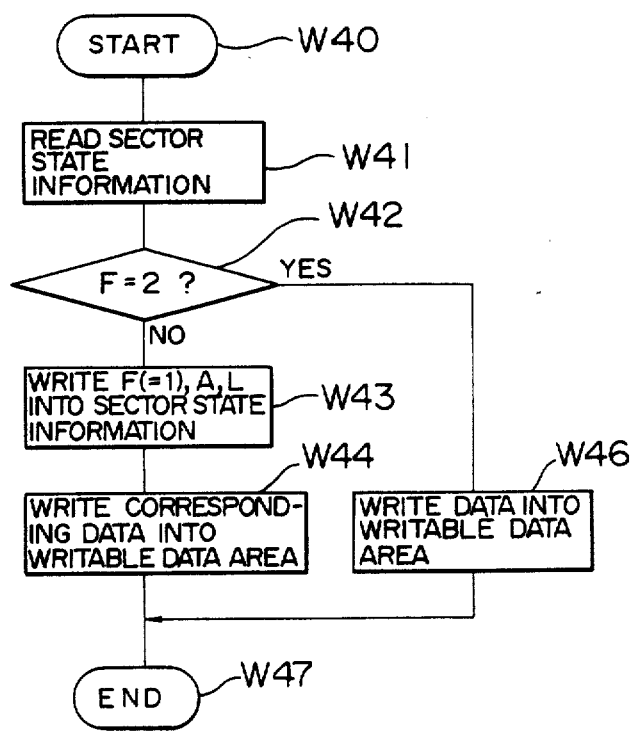
F I G. 17B

INFORMATION RECORDING/REPRODUCING APPARATUS

BACKGROUND OF THE INVENTION

Field of the Invention

The present invention generally relates to an information recording/reproducing apparatus, and more particularly to an information recording/reproducing apparatus for recording/reproducing data on an optical disc having a track structure having a storage area composed of a plurality of sectors.

Conventional information recording/reproducing devices include an information recording/reproducing apparatus of the read-only type in which information of a read-only information storage medium is reproduced and another information recording/reproducing apparatus of the recording/reproducing type in which information is recorded onto and reproduced from a medium capable of recording/reproducing information.

In the conventional information recording/ reproducing apparatus of the read-only type, a read-only optical disc (hereinafter referred to as "R/O disc") in which data have been recorded in the form of uneven pit portions on a disc-like plastic substrate is irradiated with a laser beam to thereby reproduce the data. In this apparatus, there is provided no recording means and data which have been recorded on a R/O disc by means of any other means are reproduced. Because of a large capacity, random accessibility, easiness in large quantity reproduction, and a low cost, the R/O disc has been proposed to use as a disc for recording a dictionary for word processing and/or font patterns, or as a disc for storing programs, manuals, etc.

In the conventional information recording/ reproducing apparatus of the recording/reproducing type, on the other hand, data recording as well as data reproducing can be carried out on a writable optical disc (hereinafter referred to as "writable disc") by irradiating the writable disc with a laser beam and there are provided recording means as well as reproducing means. The writable disc not only has properties of a large capacity and random accessibility similarly to the R/O disc, but is capable of performing data recording which is impossible on the R/O disc, and therefore utilization of the R/O disc has been proposed as an auxiliary storage for a computer like a hard disc and a floppy disc.

However, since a R/O disc is used only for reading data and produced in an exclusive factory, it is impossible for a user to change or supplement various data supplied by the R/O disc. Data subject to a computer are, however, frequently changed, so that it is necessary for a user to buy a new R/O disc every time the data are changed and it is required for a supplier to produce a new R/O disc every time the data are changed. Thus, there has been a problem that a R/O disc has a limit in use particularly when used in a computer because it can deal with only fixed and stationary data.

On the other hand, a writable disc has a problem that plenty of time is required when a larger quantity of information storage media of the same contents are duplicated, while there has been not such a problem that data recording cannot be achieved like the foregoing R/O disc.

SUMMARY OF THE INVENTION

It is therefore an object of the present invention to provide an information recording/reproducing apparatus in which a user can change or supplement data on a duplicated R/O disc.

According to the present invention, the information recording/reproducing apparatus comprises address reading means for reading sector address information, address comparing means for comparing the sector address information with a target sector address, reproducing means for reproducing data from a read-only data area and a writable data area, recording means for recording data onto a writable data area, and control means for controlling the reproducing means and the recording means for performing reproduction with respect to the read-only data area of a read-only/writable mixed-area type sector and for performing reproduction/recording with respect to the writable data area.

In the arrangement as described above according to the present invention, in a storage medium including read-only/writable mixed-area type sectors each composed of a read-only data area and a writable data area, control is made so as to perform reproduction of a read-only data area of a target sector indicated by an address coincidence output of the address comparing means and reproduction/ recording of a writable data area of the target sector.

BRIEF DESCRIPTION OF THE DRAWINGS

FIGS. 3A, 3B, 3C, and 3D are diagrams for explaining the sector format of the optical disc in the embodiment of FIG. 1;

FIG. 5A is a block diagram showing a second embodiment of the information recording/reproducing apparatus according to the present invention;

FIGS. 6A, 6B, 6B(1), and 6B(2) are diagrams for explaining the sector format of the optical disc in the embodiment of FIG. 5;

FIG. 7A is a block diagram showing a third embodiment of the information recording/reproducing apparatus according to the present invention;

FIGS. 8A, 8B, 8B(1), and 8B(2) are diagrams for explaining the sector format of the optical disc in the embodiment of FIG. 7;

FIG. 9 is a block diagram showing a fourth embodiment of the information recording/reproducing apparatus according to the present invention;

FIG. 14 is a diagram showing a first sector configuration in a fifth embodiment;

FIGS. 17A and 17B are flowcharts for explaining the operation of the control means on the second sector configuration of FIG. 16.

DESCRIPTION OF THE PREFERRED EMBODIMENTS

Figure 1:
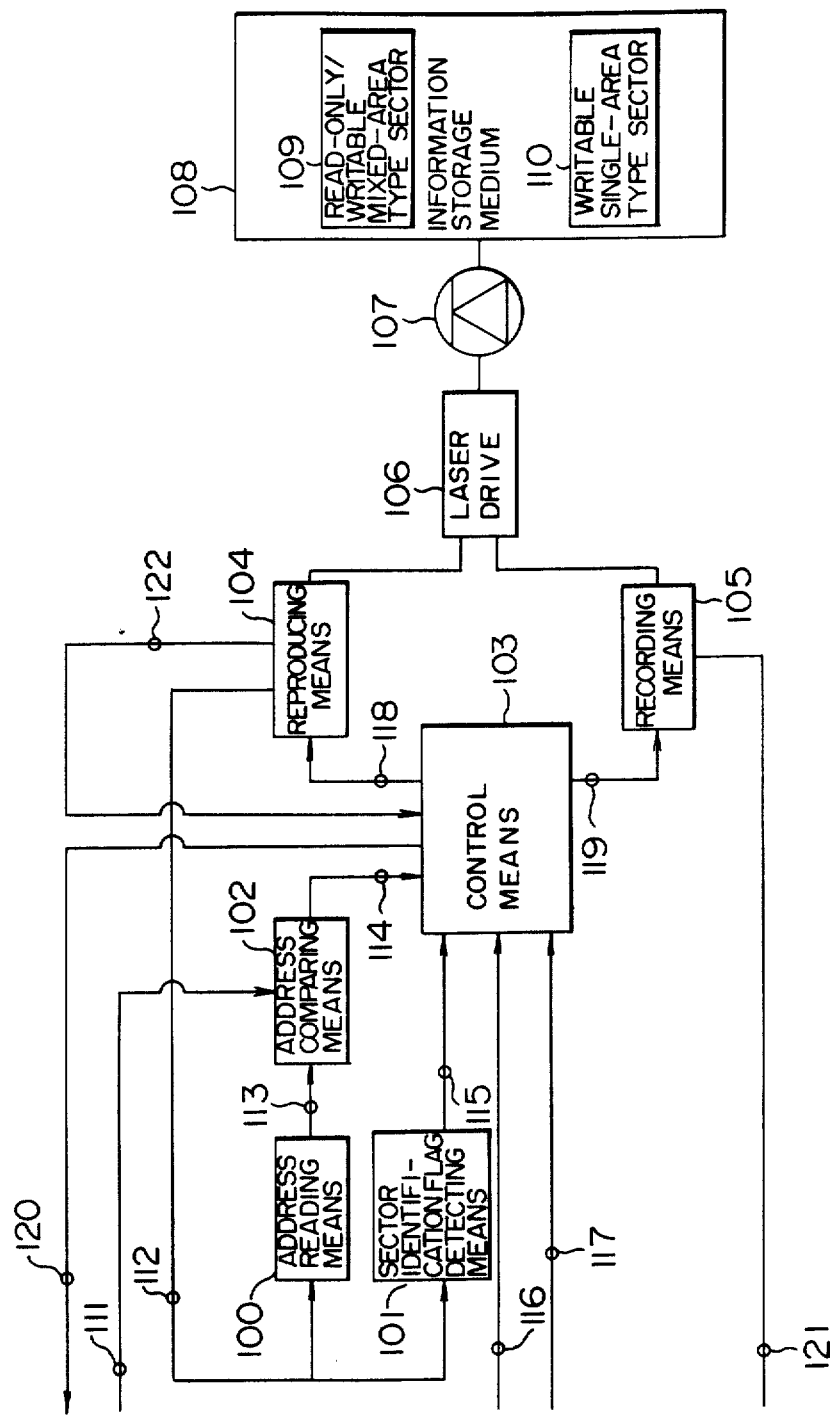
FIG. 1 is a block diagram showing a first embodiment of the information recording/reproducing apparatus according to the present invention.

FIG. 1 is a block diagram showing a first embodiment of the information recording/reproducing apparatus according to the present invention. In FIG. 1, address reading means 100 are provided for reading the address from a signal (sector identification area reproduction signal 112) reproduced from a sector identification area (having an address and a sector identification flag) in a sector. The reference numeral 113 designates a reproduction address signal read by the address reading means 100. Sector identification flag detecting means 101 are provided for detecting a sector identification flag from the sector identification area reproduction signal 112. The reference numeral 115 designates a sector identification flag signal detected by the sector identification flag detecting means 101. Address comparing means 102 are provided for comparing an input target address signal 111 with the reproduction address signal 113 to judge whether the two signals coincide with each other. The reference numeral 114 designates an address coincidence signal which indicates the coincidence of address and is fed from the address comparing means 102. Control means 103 are provided for analizing a reproduction sector signal with reference to the sector identification flag signal 115 of the sector identified by the address coincidence signal 114 and for thereby generating a reproduction data signal 120 corresponding to an input read signal 117 in reproducing time and for controlling a recording process to the recording means 105 with reference to the signal 115 corresponding to an input write signal 116 in recording time. The reproducing means 104 are provided for instructing a laser drive 106 to reproduce the sector corresponding to the reproduction request signal 118 fed from the control means 103 to thereby generate a reproduction sector signal 122 as the result of reproduction and for instructing the laser drive 106 to reproduce the sector identification area of the respective sector. The recording means 105 are provided for instructing the laser drive 106 to record a recording data signal 121 which is data fed externally in response to the recording request signal 119 fed from the control means 103. The reference numeral 106 designates a laser drive for driving a semiconductor laser 107 in accordance with the instructions sent from the reproducing means 104 and recording means 105. The reference numeral 108 designates an information storage medium arranged to be irradiated with laser light from the semiconductor laser 107. The information storage medium 108 internally has read-only/writable mixed-area type sectors 109 and writable single-area type sectors 110.

Figure 2A:
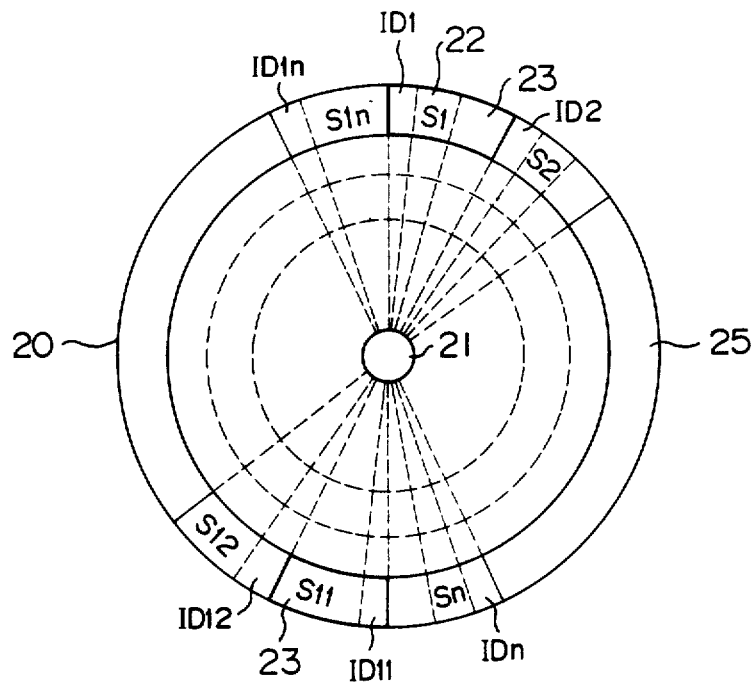
FIG. 2A is a plan view of a first embodiment of the optical disc applied to the information recording/ reproducing apparatus according to the present invention.
Figure 2B:
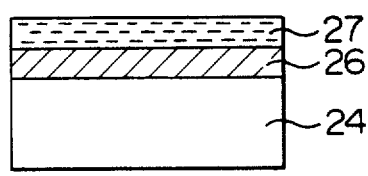
FIG. 2B is a sectional view showing the convex portion of the read-only data area.
Figure 2C:
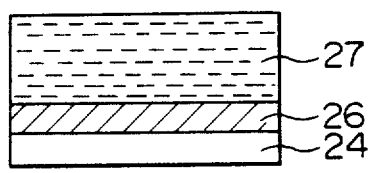
FIG. 2C is a sectional view showing the concave portion of the read-only data area.
Figure 2D:
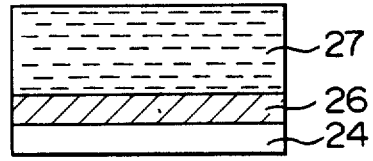
FIG. 2D is a sectional view showing the writable data area.

FIGS. 2A, 2B, 2C and 2D show an optical disc which is applicable to the first embodiment of the invention, in which FIG. 2A is a plan view of the optical disc; FIG. 2B is a sectional view of a convex portion of the read-only data area; FIG. 2C is a sectional view of a concave portion of the read-only data area; and FIG. 2D is a sectional view of the writable data area. In FIGS. 2A to 2D, the reference numeral 20 designates an optical disc; the reference numeral 21 designates a center hole for mounting the optical disc onto a disc motor; each of S1, S2, ..., Sn, S11, S12, ..., and S1n designates a sector; each of ID1, ID2, ..., IDn, ID11, ID12, ..., and ID1n designates a sector identification area where the of the respective sector have been recorded; the reference numeral 22 designates a read-only data area; the reference numeral 23 designates a writable data area; the reference numeral 25 designates a track formed like a groove; the reference numeral 24 designates a disc substrate formed of polycarbonate resin or the like; the reference numeral 26 designates an optically or thermally recording material where a signal is written by the laser light; and the reference numeral 27 designates a protecting layer for protecting the optically or thermally recording material 26. Each of the sectors S1, S2, ..., and Sn represents the read-only/writable mixed-area type sector as described above, and each of the sectors S11, S12, ..., and S1n represents the writable single-area type sector as described above. It is needless that the read-only/ writable mixed-area type sector and the writable single-area type sector are adjacent to each other. Furthermore, it is not required that the two types of sectors be disposed on one and the same track.

The optical disc 20 has groove-like tracks 25 formed on the disc substrate 24, and each of the tracks 25 is separated into a plurality of sectors S each having a sector identification area ID composed of address information and a sector identification flag, and a data area composed of a read-only data area 22 and a writable data area 23. All over the tracks, the entire surface of the optical disc 20 are uniformly coated with the optically or thermally recording material 26 by evaporating deposition.

In the read-only data area 22 and the sector identification area ID, the optically or thermally recording material 26 functions as a reflection film to reflect low-intensity laser light for performing reading.

In the writable data area 23, the optically or thermally recording material 26 functions as a medium for recording a signal in the form of the change of reflectivity or the formation of a hole owing to the radiation of high-intensity laser light for performing recording. In the case where a photomagnetic material is used as the optically or thermally recording material 26, its domain is inverted so that the recording signal can be read out by the rotation of the plane of polarization of the reflected light according to the Faraday effect. The recording method is applicable to both the discs of write-once and erasable types.

As described above, according to the optical disc of this embodiment, the read-only data area 22 and the writable data area 23 can be formed of the same optically or thermally recording material 26 to thereby facilitate manufacturing of an optical disc in which the read-only area and the writable area are disposed within one sector.

FIGS. 3A, 3B, 3C and 3D are views for explaining the sector identification flag FLG of the respective sector identification area ID of the optical disc in the above-described embodiment. FIG. 3A shows a sector format in a read-only/writable mixed-area type sector, FIG. 3B shows a sector format in a writable single-area type sector, FIG. 3C shows a specific example including the address ADR, the sector identification flag FLG1, and the error detection code CRC in the read-only/writable mixed-area type sector, and FIG. 3D shows another specific example including the address ADR, the sector identification flag FLG2, and the error detection code CRC in the writable single-area type sector.

In the sector identification area ID, PR represents a preamble for clock regeneration, AM represents an address mark showing the start of address information, ADR represents an address, FLG1 represents a sector identification flag showing the read-only/ writable mixed-area type sector, FLG2 represents another sector identification flag showing the writable single-area type sector, CRC represents an error detection code such as a cyclic redundancy check code, PO represents a postamble, and each of G1, G2 and G3 represents a gap for absorbing the rotational change of the optical disc. The respective gap has no information recorded thereon.

In the read-only data area of the read-only/ writable mixed-area type sector, SYNC represents a clock synchronization signal, DM represents a data mark indicating the start of data, DATA represents data, and ECC represents an error detection/correction code.

The ADR is composed of two bytes of track address information (a high-byte track address TA.H, and a low-byte track address TA.L) and sector address information SA.

Figure 4A:
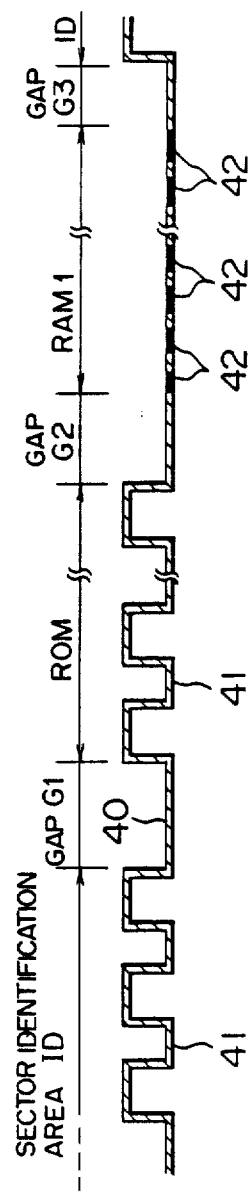
FIGS. 4A and 4B are enlarged sectional views of the track of the optical disc in the embodiment of FIG. 1.
Figure 4B:
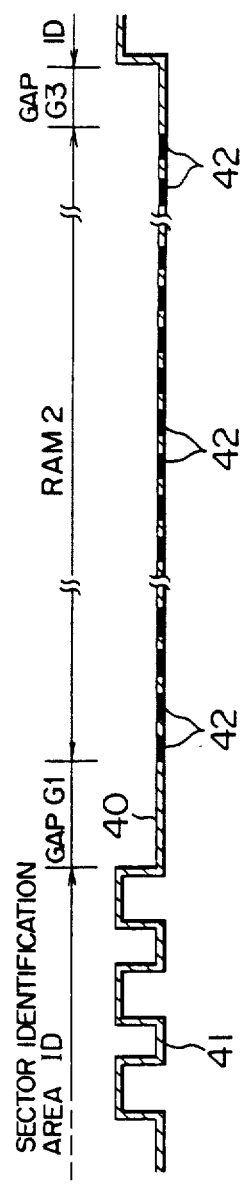

FIGS. 4A and 4B are enlarged sectional views of a track of the optical disc according to the directly above-described embodiment, in which FIG. 4A is a fragmentary enlarged view of the read-only/writable mixed-area type sector including a sector identification area ID, a gap G1, a read-only data area, a gap G2 and a writable data area; and FIG. 4B is a fragmentary enlarged view of the writable single-area type sector including a sector identification area ID, a gap G1 and a writable data area.

In FIGS. 4A and 4B, each of the read-only/ writable mixed-area type sector and the writable single-area type sector has an optically or thermally recording material 40 formed thereon. The respective sector identification area ID has pits 41 by which address information of the sector is formed. In the read-only/ writable mixed-area type sector, the read-only data area ROM has pits 41 for forming data thereat in the same manner as the sector identification area ID. Each of the writable data area RAM1 of the read-only/writable mixed-area type sector and the writable data area RAM2 of the writable single-area type sector is formed of a groove of uniform depth, so that data to be recorded by a user can be recorded in the optically or thermally recording material 40 in the form of dots 42 owing to changes in concentration, owing to inversion of domain, owing to formation of holes, or the like. Because the same optically or thermally recording material 40 is used for both the read-only data area ROM and the writable data area RAM1, there is no necessity for forming a reflecting layer, such as an aluminum film or the like, at the read-only data area independently of the optically or thermally recording material formed at the writable data area as in the prior art. Accordingly, it is not necessary to form a specific buffer portion between the read-only data area ROM and the writable data area RAM1.

In the following, the operation of the information recording/reproducing apparatus as shown in FIG. 1 is described in detail with reference to the information storage medium (FIGS. 2A through 2D and FIGS. 3A through 3D) used in the apparatus.

The sector identification area ID of the respective sector (read-only/writable mixed-area type sector 109, writable single-area type sector 110) on the optical disc (information storage medium 108) is read by the reproducing means 104 by using laser light to obtain the sector identification area reproduction signal 112 which is then analyzed by the address reading means 100 to thereby feed an address signal 113 to the address comparing means 102. The address comparing means 102 compares the address signal 113 with an externally fed target address signal 112. If the signals coincide with each other, an address coincidence signal 114 is fed to the control means 103. ON the other hand, the sector identification flag detecting means 101 analyze the sector identification area reproduction signal 112 to thereby detect the sector identification flag FLG whether FLGb 1 or FLG20 as shown in FIGS. 3C and 3D and consequently feed a sector identification flag signal 115 to the control means 103. The control means 103 perform recording/reproducing on the information storage medium 108 on the basis of the address coincidence signal 114, the sector identification flag signal 115, and an externally fed request signal such as a write signal 116 or a read signal 117.

In the following, the operation of the control means 103 int eh case of reproduction is described in detail.

When the sector identification flag FLG of the target sector detected by the sector identification flag detecting means 101 has the value of "1" or in other words when the target sector is a read-only/writable mixed-area type sector 109, the control means 103 perform reproduction with respect to the read-only data area ROM in the sector or perform reproduction and analyzation with respect to the writable data area RAM1 in the sector. When the sector identification flag FLG has the value of "0" or in other words when the target sector is a writable single-area type sector 10, the control means 103 perform reproduction and analyzation with respect to the writable data area RAM2 in the sector. In the reproducing process for the target sector, a reproduction request signal 118 from the control means 103 is fed to the reproducing means 104 to request reproduction whereafter a reproduction data signal 120 is obtained from the reproduction sector signal 122 on the basis of the analyzation as described above. On the other hand, at the time of recording, the control means 103 perform recording with respect to the writable data area RAM1 in the sector when the sector identification flag FLG has the value of "1" representing a read-only/writable mixed-area type sector 109. When the FLG has the value of "0" representing a writable single-are type sector 110, the control means perform recording with respect to the writable data area RAM2 in the sector. In the recording process for the target sector, a recording request signal 119 from the control means 103 is fed to the recording means 105 to request recording.

The reproducing means 104 are responsive to the reproduction request signal 118 from the control means 103 to instruct the laser drive 106 to reproduce the sector corresponding to the reproduction request, and then feed a reproduction sector signal 122 as the result of reproduction to the control means 103. Furthermore, the reproducing means 104 instruct the laser drive 106 to reproduce the sector identification area of the respective sector, and feed a sector identification area reproduction signal 112. On the other hand, the recording means 105 are responsive to the recording request signal 119 from the control means 103 to instruct the laser drive 106 to record the recording data signal 121 which is externally fed data. The laser drive 106 drives the semiconductor laser 107 with a reproduction power output or a recording power output in accordance with the data reproducing/ recording instruction from the reproducing means 104 or from recording means 105. Through irradiation onto the information storage medium 108 with the laser light of the semiconductor laser 107, reproduction is made form the read-only data area ROM and the writable data area RAM1 in the read-only/writable mixed-area type sector 109 and the writable data area RAM2 in the writable single-area type sector 110. Further, the identification area ID of the respective sector is read out by use of the semiconductor laser 107, and, as the result, a sector identification area reproduction signal 112 is produced.

FIG. 5A is a block diagram showing a second embodiment of the information recording/reproducing apparatus according to the present invention. The embodiment of FIG. 5A is the same as the first embodiment except the following points.

The second embodiment is different from the first embodiment in the control means 103 and input-output signal in the reproduction system. The control means 103 are responsive to the read signal 117 as a reproduction request signal to instruct the reproducing means 104 to read the sector data information area and sector data, in the form of a reproduction sector signal 122, of the sector with respect to which the address coincidence signal 114 has been issued, by use of a sector data information area processing function 501 on the basis of the sector identification flag signal 115. On the basis of the contents of the sector data information area, the control means 103 may send the address to the reproducing means 104 by the use of a substitutive sector processing function 502 to thereby perform the same reproducing process. Furthermore, the control means 103 are responsive to the write signal 116 as a recording request signal to instruct the recording means 105 to write the sector data information area of the sector with respect to which the address coincidence signal 114 has been issued, by the use of the sector data information area processing function 501 and the substitutive sector processing function 502 in accordance with the recording request signal 119 on the basis of the sector identification flag signal 115 of the sector concerned.

FIGS. 6A, 6B, 6B(1) and 6B(2) show the sector format of the optical disc used in the second embodiment. In the drawings, the format mainly at the portions of the writable area RAM1 and RAM2 in the sector format of the optical disc of the first embodiment as shown in FIGS. 3A to 3D is shown particularly in detail. The writable area RAM1 int he read-only/writable mixed-area type sector is separated into a substitutive flag A—FLG and a substitutive sector address A—ADR as shown in FIG. 6A. The substitutive flag A₁₃ FLG represents a flag for indicating whether the data in the data area of the sector concerned is to be used or the data in a substitutive sector should be used. The substitutive sector address A—ADR represents an address of a sector substitutive for the data in the ROM area in the sector concerned. THe substitutive flag A—FLG and the substitutive sector address A—ADR are generically named the sector data information area SEC—INFO as described above. On the other hand, the writable area RAM2 in the writable single-area type sector may be used in such a manner that the entire area of the RAM thereof is used for data as shown in FIG. 6B(1) or that the RAM area thereof is separated into a sector data information area SEC—INFO, which is composed of a substitutive flag A—FLG and a substitutive sector address A—ADR, and a data area SEC—DATA, as shown in FIG. 6B(2). The substitutive flag A—FLG is used in the same meaning as described above.

Figure 5B:
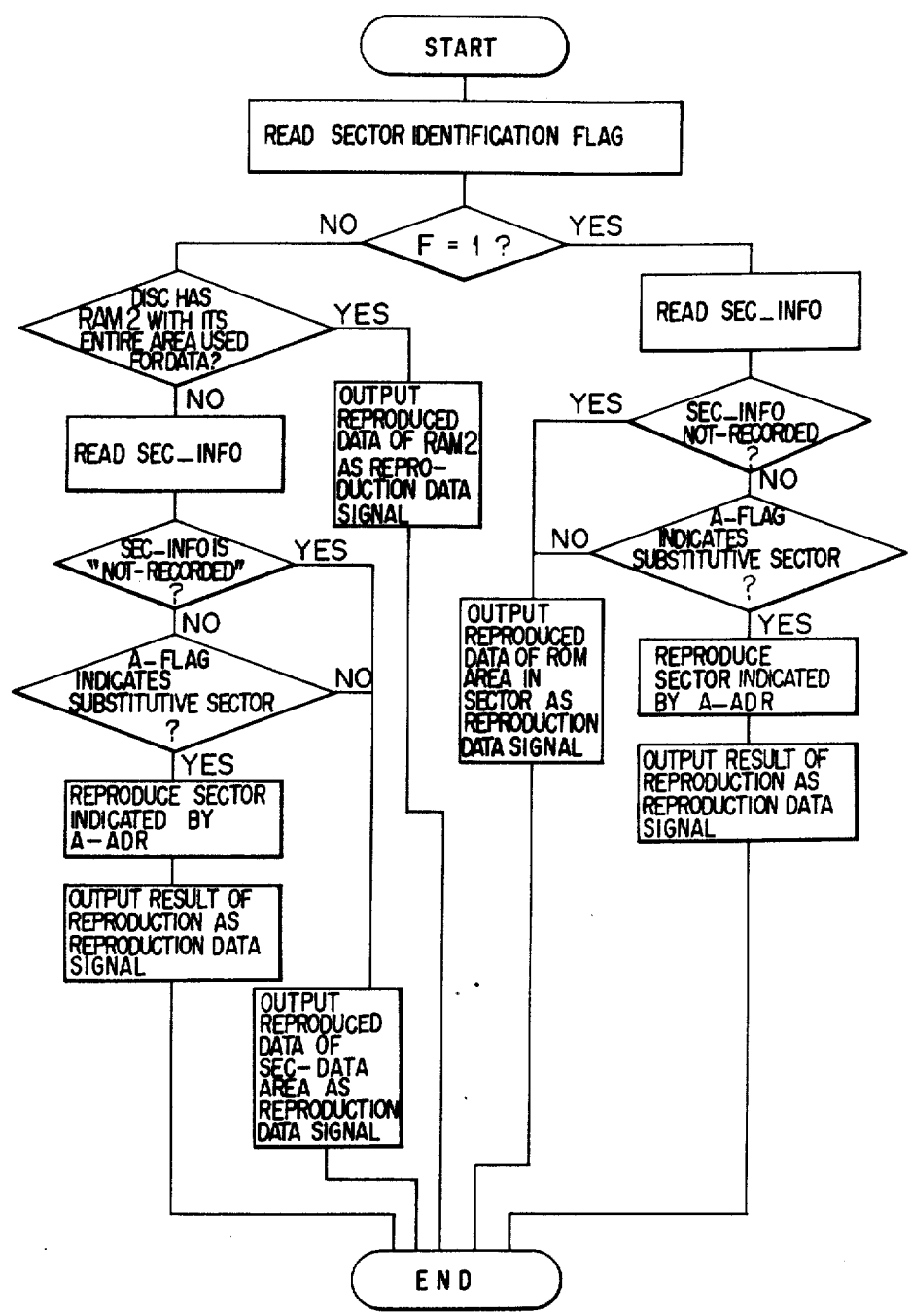
FIG. 5B is a flowchart for explaining the operation of the control means in reproducing operation of the second embodiment.
Figure 5C:
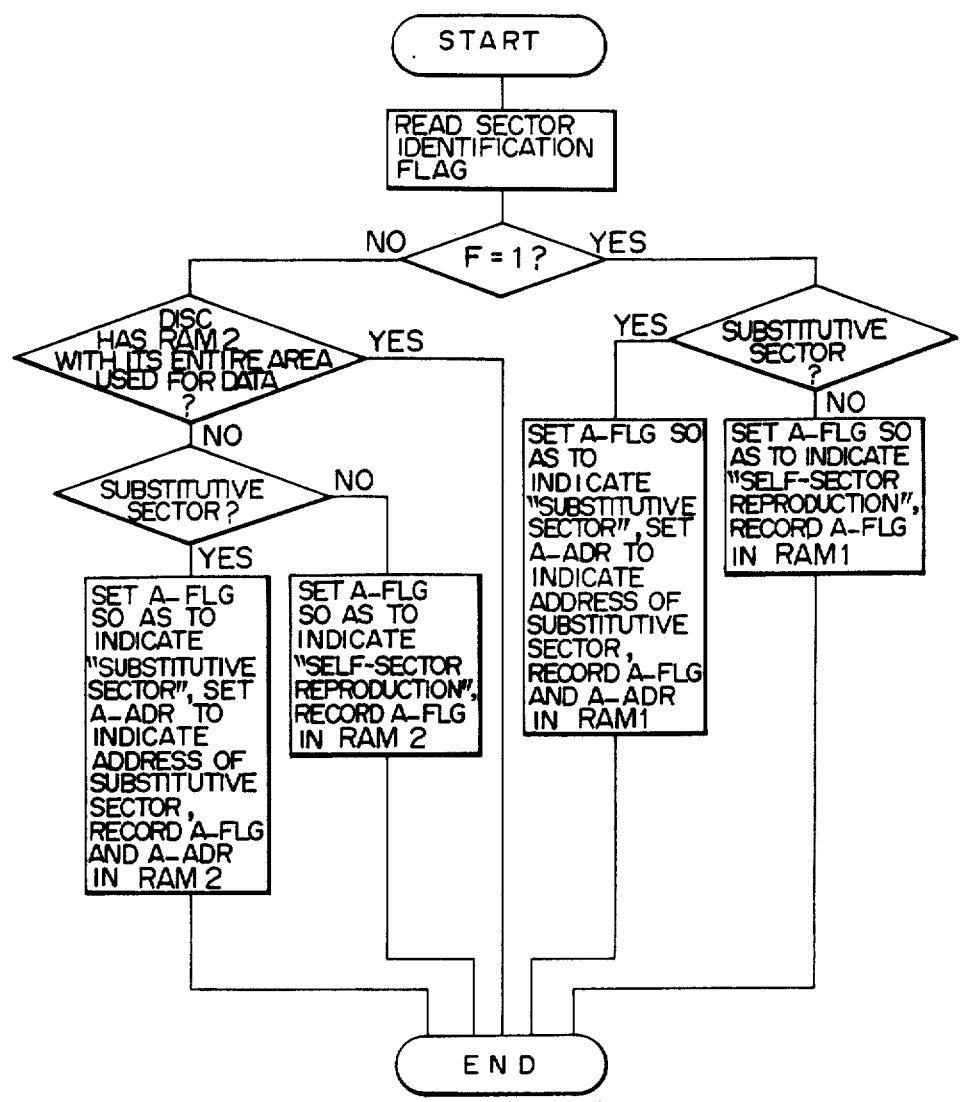
FIG. 5C is a flowchart for explaining the operation of the control means in recording operation on the sector data area SEC_INFO in the second embodiment.

In the following, the operation of the second embodiment of the information recording/reproducing apparatus as shown in FIG. 5A is describe din detail with reference to the specific example of the information storage medium (FIGS. 2A to 2B and FIGS. 6A to 6B(2) showing the sector format) used in the apparatus. The control means 103 has a microcomputer which executes the flow-chart of FIG. 5B at the time of reproduction and which executes the flowchart of FIG. 5C at the time of recording the sector data information area SEC—INFO.

In the following, the operation of the control means 103 at the time of reproduction is described in detail.

In the case where the sector identification flag FLG of the target sector detected by the sector identification flag detecting means 101 has the value of "1" or in other words where the target sector is a read-only/writable mixed-area type sector 109, the control means 103 cause the reproducing means to reproduce data in the sector data information area SEC—INFO (FIG. 6A) composed of a substitutive flag A—FLG and a substitutive sector address A—ADR in the writable data area RAM1 in the target sector 109. When the substitutive flag A—FLG indicates that the data of the sector concerned should be used or that the sector data information area SEC—INFO has been not recorded yet, the control means 103 cause the reproducing means to reproduce data in the read-only data area ROM in the sector concerned by use of the sector data information area processing function 501. When the substitutive flag A—FLG indicates that the data in a substitutive sector should be used, the control means 103 cause the reproducing means to reproduce data in the substitutive sector indicated by the substitutive sector address A—ADR by use of the substitutive sector processing function 502. On the other hand, in the case where the sector identification flag FLG has the value of "0" showing that a target one is a writable single-area type sector 110, the control means 103 perform reproduction and analyzation with respect to the data in writable data area RAM2 in the sector concerned. In this case, the control means 103 reproduce data in the RAM 2 when the entire of the RAM2 is used as data as shown in FIG. 6B(1), while the control means 103 perform reproduction with respect tot he sector data information area SEC_INFO when the RAM2 is separated into the sector data information area SEC_INFO and the sector data area SEC_DATA as shown in FIG. 6B(2). Furthermore, if the substitutive flag A_FLG indicates that the data area SEC_DATA in the sector concerned should be used as data or the sector data information area SEC_INFO has been to recorded yet, the control means 103 perform reproduction with respect to the data area SEC_DATA in the sector concerned by use of the sector data information area processing function 501. If the substitutive flag A_FLAG indicates that the data of a substitutive sector should be used, the control means 103 perform processing for reproduction of the sector indicated by the substitutive sector address A_ADR by use of the substitutive sector processing function 502. In the process for reproduction of the target sector, a reproduction request signal 118 is sent from the control means 103 to the reproducing means 104, while the sector data information area SEC_INFO and sector data of the target sector are sent back from the reproducing means 104 to the control means 103 in the form of the sector signal 122.

In the following, the operation of the control means 103 at the time of recording the sector data information area SEC_INFO is described in detail. In the case where the sector identification flag FLG of the target sector has the value of "1" indicating a read-only/writable mixed-area type sector 109, the substitutive flag A_FLG in the sector data information area SEC_INFO is set to use the data in the sector concerned by use of the sector data information area processing function 501 if the ROM area of the sector should be used as the data. If data in a substitutive sector is used, the substitutive flag A_FLG in the sector data information area SEC_INFO is set to use the data int he substitutive sector as data by use of the sector data information area processing function 501, and, furthermore, the substitutive sector address A_ADR is set to indicate the substitutive sector. In setting the flag and the substitutive sector address, recording is made onto the writable data area RAM1 in the sector concerned. In the case where the sector identification flag FLG of the target sector has the value of "0" indicating a writable single-area type sector 110, the sector data information area SEC_INFO is not recorded when the entire area of the RAM2 is used for data as shown in FIG. 6B(1). When the area of the RAM2 is separated into the sector data information area SEC_INFO and the data area SEC_DATA as shown in FIG. 6B(1), and the data area SEC_DATA in the sector concerned is used for the data, the substitutive flag A_FLG in the sector data information area SEC_INFO is set to use the data in the sector area to use the data in the sector area by use of the sector data information area processing function 501 to thereby perform data recording. If the data in a substitutive sector is to be used, the substitutive flag A_FLG in the sector data information area SEC_INFO is set to use the data in the substitutive sector by use of the sector data information area processing function 501, and, furthermore, the substitutive sector address A_ADR is set so as to indicate the substitutive sector. In setting the flag and the substitutive sector address and recording the data, recording is made onto the writable data area RAM2 in the sector. In the process for recording the sector data information area SEC_INFO in the target sector, a recording request signal 119 containing information of the substitutive flag A_FLG and the substitutive sector address A_ADR existing int he sector data information area SEC_INFO is sent from the control means 103 to the recording means 105.

IN recording the data to the target sector in which FLG is "0" showing a writable single-area type sector 110, on the other hand, when the entire area of the RAM2 is used for data as shown in FIG. 6B(1), the data recording is made onto the RAM2, while when the RAM2 is separated into the sector data information area SEC_INFO and the data area SEC_DATA as shown in FIG. 6B(2), the data recording is made onto the data area SEC_DATA in the sector concerned.

Figure 7B:
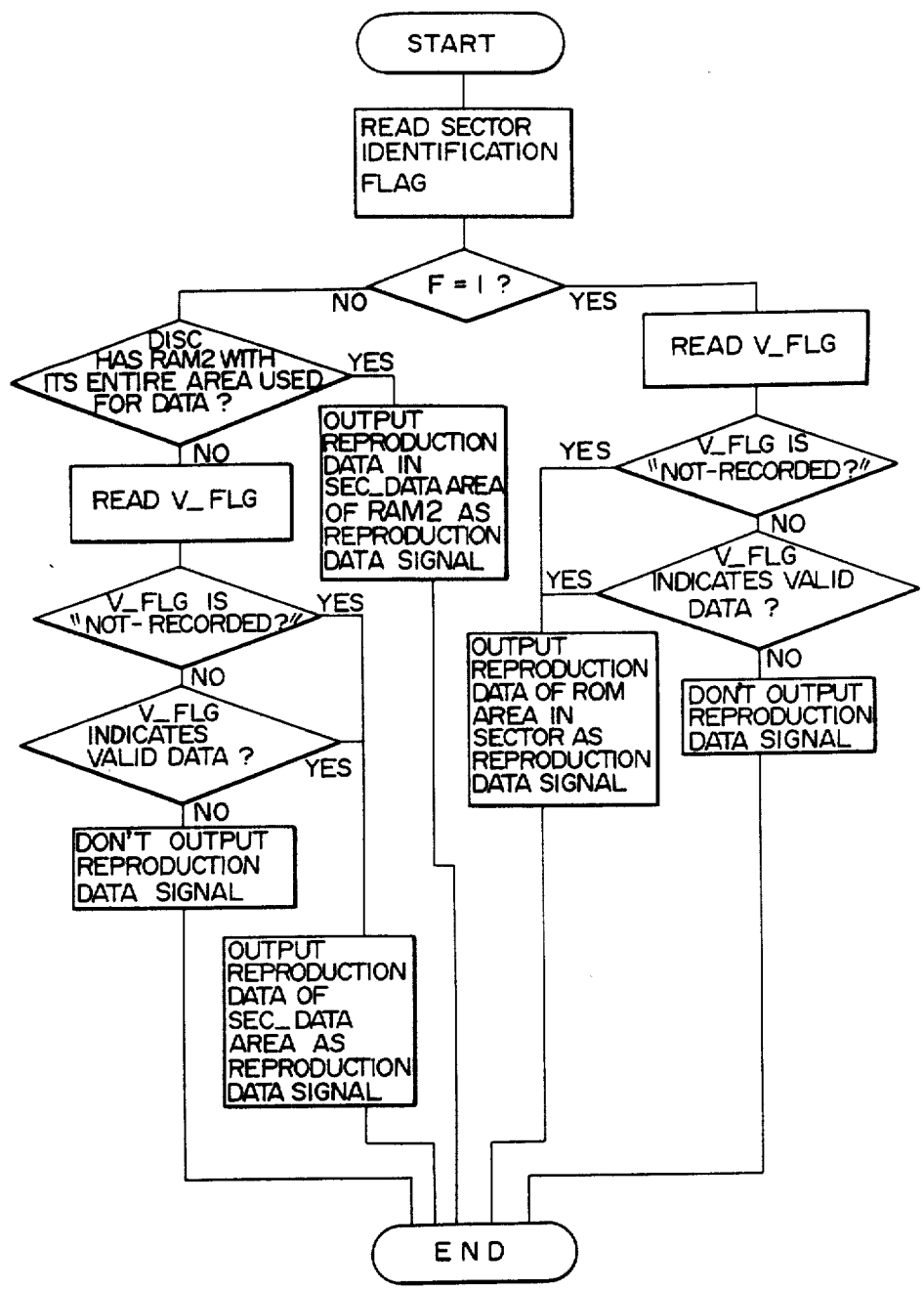
FIG. 7B is a flowchart for explaining the operation of the control means in reproducing operation of the third embodiment.
Figure 7C:
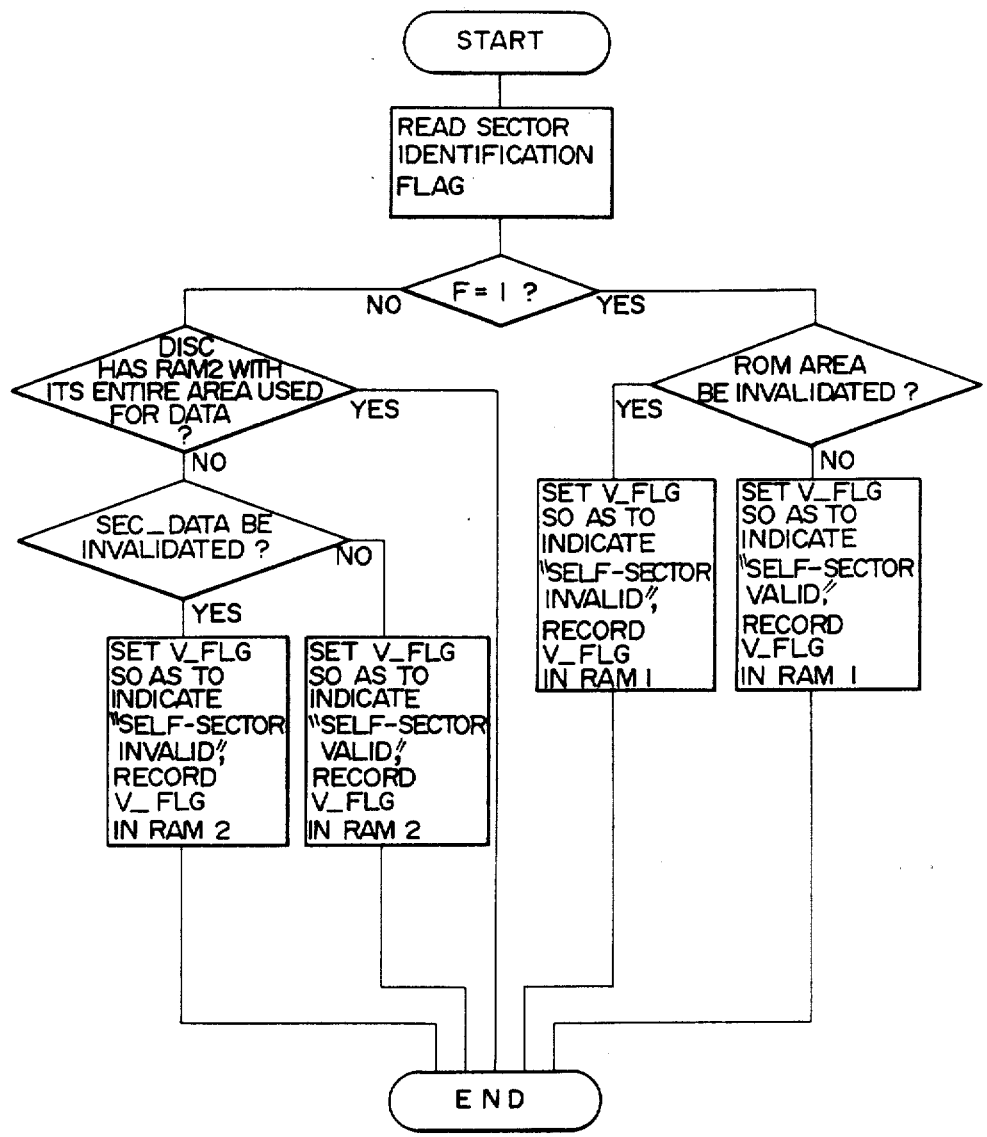
FIG. 7C is a flowchart for explaining the operation of the control means in recording operation on the valid flag V_FLG in the third embodiment.

FIG. 7 is a block diagram of a third embodiment of the information recording/reproducing apparatus according to the present invention. The embodiment of FIG. 7 is the same as the fist embodiment except the following points.

The third embodiment is different from the first embodiment in the control means 103 and the input-output signal for reproduction. The control means 103 are responsive to the read signal 117 as a reproduction request signal to instruct the reproducing means 104 to read the sector data information area and sector data, int eh form of a reproduction sector signal 122, of the sector with respect to which the address coincidence signal 114 has been issued, on the basis of the sector identification flag signal 115. On the basis of the contents of the sector data information area, the control means 103 judges, by use of a valid sector processing function 701, whether the data of the sector should be sent as a reproduction data signal 120. Furthermore, the control means 103 are responsive tot he input write signal 116 as a recording request signal to instruct the recording means 105 to write the sector data information area of the sector with respect to which the address coincidence signal 114 has been issued, by the use of the valid sector processing function 701, in accordance with the recording request signal 119 on the basis of the sector identification flag signal 115 of the sector concerned.

FIGS. 8A, 8B, 8B(1) and 8B(2) show the sector format of the optical disc used in the third embodiment. In the drawings, the format mainly at the portions of the writable area RAM1 and RAM2 in the sector format op the optical disc of the first embodiment as shown in FIGS. 3A to 3D is shown particularly in detail.

The writable area RAM1 in the read-only/writable mixed-area type sector is formed of a valid flag V_FLG as shown in FIG. 8A. The valid flag V_FLG represents a flag for judging whether the data of the sector is valid or not. On the other hand, the writable area RAM2 in the writable single-area type sector may be used in such a manner that the entire area of the RAM is used for data as shown in FIG. 8B(1) or that the RAM area is separated into a valid flag V_FLG and a data area SEC_DATA as shown in FIG. 8B(2). The valid flag V_FLG is used in the same meaning as described above.

In the following, the operation of the information recording/reproducing apparatus according to the third embodiment as shown in FIG. 7 is described in detail with reference to the information storage medium (FIGS. 2A to 2B and FIGS. 8A to 8B(2)) showing the sector format) used in the apparatus. The control means 103 has a microcomputer which executes the flowchart of FIG. 7A at the time of reproduction and which executes the flowchart of FIG. 7B at the time of recording the valid flag V_FLG.

In the following, the operation of the control means 103 at the time of reproduction is describe din detail. In the case where the sector identification flag FLG of the target sector detected by the sector identification flag detecting means 101 has the value of "1" or in other words where the target sector is a read-only/writable mixed-area type sector 109, the control means 103 perform reproduction of the valid of flag V_FLG (FIG. 8A) of the writable data area RAM1 in the sector concerned. When the valid flag V_FG indicates that the data of the sector is valid or that the valid flag V_FLG has been not recorded yet, the control means 103 perform reproduction of the read-only odata area ROM in the sector concerned by the use of the valid sector processing function 701. When the valid flag V_FLG indicates that the data of the sector is invalid, the control means 103 do not perform reproduction of the ROM. On the other hand, in the case where the sector identification flag FLG has the value of "0" indicating a writable single-area type sector 110, the control means 103 perform reproduction and analyzation of the writable data area RAM2 in the sector concerned. In this case, the control means 103 perform reproduction and analyzation of the RAM2 when the entire area of the RAM2 is used for data as shown in FIG. 8B(1). When the RAM2 is separated into a valid flag V_FLG and a data area SEC_DATA as shown in FIG. 8B(2), the control means 103 utilize the valid sector processing function 701. In other words, if the valid flag V_FLG indicates that the sector is valid or that the valid flag V_FLG has been not recorded yet, the control means 103 perform reproduction of SEC_DATA in the sector concerned. If the valid flag V_FLG indicates that the sector is not valid, the control means 103 do not perform reproduction. In the process for reproduction of the target sector, a reproduction request signal 118 is sent from the control means 103 to the reproducing means 104, and the valid flag V_FLG of the target sector is sent back, on the contrary, from the reproducing means 104 to the control means 103 in the form of a reproductive sector signal 122.

In the following, the operation of the control means 103 in recording the valid flag V_FLG is described in detail. In the case where the sector identification flag FLG of the target sector has the value of "1" indicating a read-only/writable mixed-area type sector 109, the valid flag V_FLG of the writable area RAM1 in the sector concerned is set to indicate that the sector area thereof is valid by use of the valid sector processing function 701 when the ROM area of the sector concerned should be used as data, while if the ROM area is not used as data, the valid flag V_FLG is set to indicate that the sector area is invalid. In the case where the sector identification flag FLG has the value of "0" indicating a writable single-area type sector 110, the valid flag V_FLG is not recorded when the entire area of the RAM2 is used as data as shown in FIG. 8B(1), while when the RAM2 is separated into a valid flag V_FLG and a data SEC_DATA as shown in FIG. 8B(2) and if the data area SEC_DATA in the sector concerned is used as data, the valid flag A_FLG of the writable area RAM2 in the sector concerned is set to indicate that the sector area thereof is valid by use of the valid sector processing function 701. If the data area SEC_DATA is not used as data, on the contrary, the valid flag V_FLG is set to indicate that the sector area is invalid. In the recording process in the target sector, a recording request signal 119 containing information of the valid flag V_FLG is sent from the control means 103 to the recording means 105.

At the time of data recording, on the other hand, when the entire area RAM2 is used as data as shown in FIG. 8B(1) with respect to the target sector in which FLG is "0" indicating a writable single-area type sector 110, data recording is made onto the RAM2. When the RAM2 area is separated into a valid flag V-FLG and a data area SEC_DATA as shown in FIG. 8B(2), data recording is made onto the data area SEC_DATA in the sector concerned.

According to the present invention, both the read-only data (ROM data) and the writable data (RAM data) exist in one and the same sector as described in the first embodiment, so that both the merits of ROM and RAM can be utilized. Particularly, as illustrated in the second embodiment, because ROM and RAM coexist in the sector, information for committing the take-over of the ROM data to the ROM or RAM data area of another sector (that is, the substitutive flag and the substitutive sector address) can be written in the same sector. Accordingly, simple and high-speed reproduction/recording can be made. In addition, as illustrate din the third embodiment, because the flag for indicating validity/invalidity exists in the RAM area of the same sector, the process of erasing data in the sector is simplified. The RAM area may be of a write once type or may be of an erasable type.

FIG. 9 is a block diagram of a fourth embodiment of the information recording/reproducing apparatus according to the present invention, as shown by simplification of FIG. 1. In FIG. 9, the reference numeral 1001 (108) designates an information storage medium having both a physically recorded area and an electrically recordable area, 1002 (104) reproducing means, 1003 (105) recording means and 1004 (103) control means. The parenthesized numerals designate those used for corresponding blocks shown in FIG. 1.

The operation of the thus arranged fourth embodiment of the information recording/reproducing apparatus according to the present invention will be described hereunder.

Figure 10:
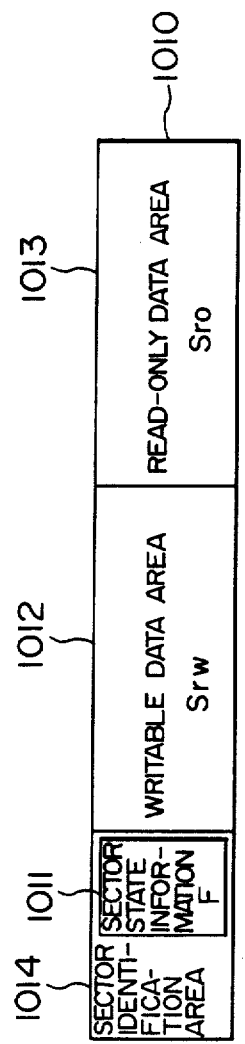
FIG. 10 is a diagram showing a first sector configuration in the fourth embodiment.

FIG. 10 shows a first example of the configuration of the sector. In FIG. 10, a sector 1010 is composed of a sector identification area 1014, a writable data area 1012, and a read-only data area 1013. The read-only data area 1013 is provided with information recorded thereon in the form of uneven pits. The sector identification area 1014 is provided with sector state information 1011. The contents F of the sector state information 1011 may take two values "0" and "1" alternatively, the former representing the state of "not-renewed" and the latter representing the state of "already-renewed". In the initial state, the contents F take the value "0". that is, $F=0$. Assume that the quantity of information $Srw$ which can be stored in the writable data area 1012 is equal to the quantity of information $Sro$ which can be stored in the read-only data area 1013, that is, $Srw=Sro$. Under the condition, the operation of the control means 4 will be explained according to the flowcharts of FIGS. 11A and 11B.

Figure 11A:
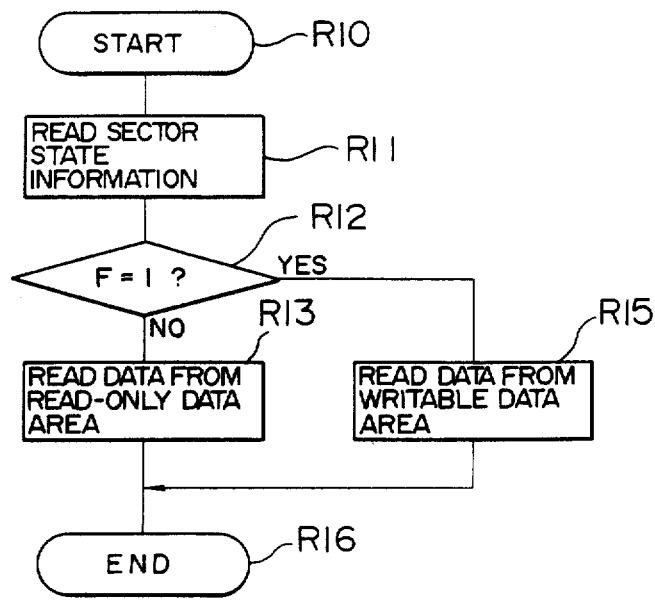
FIGS. 11A and 11B are flowcharts for explaining the operation of the control means on the first sector configuration of FIG. 10.

FIG. 11A: When an information reproducing request from a target sector is issued:

R10: An information reproducing operation is started.

R11: The contents F of the sector state information 1011 are read.

R12 If F=1, the operation is shifted to the step R15.

R13: The reproducing means 1002 is instructed to read the information from the read-only data area 1013, and the operation is shifted to the step R16.

R15: The reproducing means 1002 is instructed to read the information from the writable data area 1012.

R16: The information reproducing operation is ended.

Figure 11B:
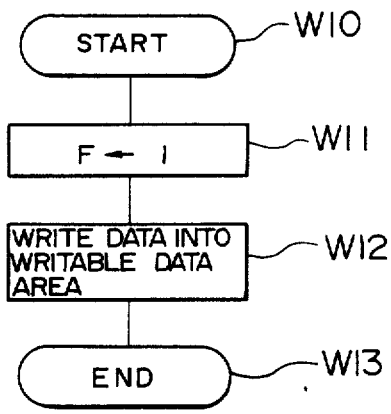

FIG. 11B: When an information recording request onto a target sector is issued:

W10: An information recording operation is started.

W11: The contents F of the sector state information 1011 are changed to be F=1.

W12: The recording means 1003 is instructed to write the information into the writable data area 1012.

W13: The information recording operation is ended.

Figure 12:
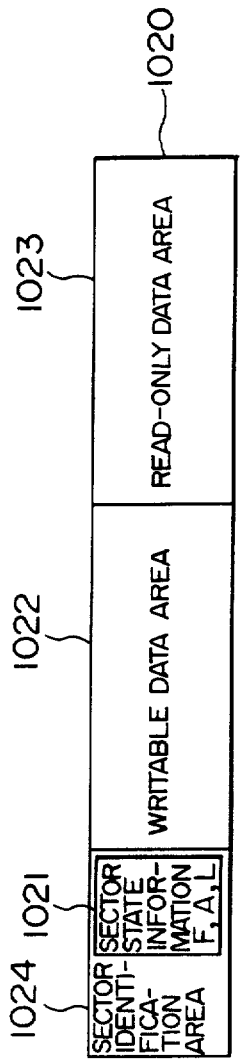
FIG. 12 is a diagram showing a second sector configuration in the fourth embodiment.

FIG. 12 shows a second example of the configuration of the sector. In FIG. 12, a sector 1020 is composed of a sector identification area 1024, a writable data area 1022, and a read-only data area 1023. The read-only data area 1023 is provided with information recorded thereon in the form of uneven pits. The sector identification area 1024 is provided with sector state information 1021. The sector state information 1021 is composed of state information F, correction position A and correction length L. The contents of the state information F are similar to the contents F of state information 1011 in FIG. 10. Assume that the quantity of information Srw which can be stored in the writable data area 1022 is equal to or smaller than the quantity of information Sro which can be stored in the read-only data area 1023, that is, Srw≦Sro, and that the correction length L is equal to or smaller than the quantity of information Srw, that is, L≦Srw. Under the condition, the operation of the control means 1004 will be explained according to the flowcharts of FIGS. 13A and 13B.

Figure 13A:
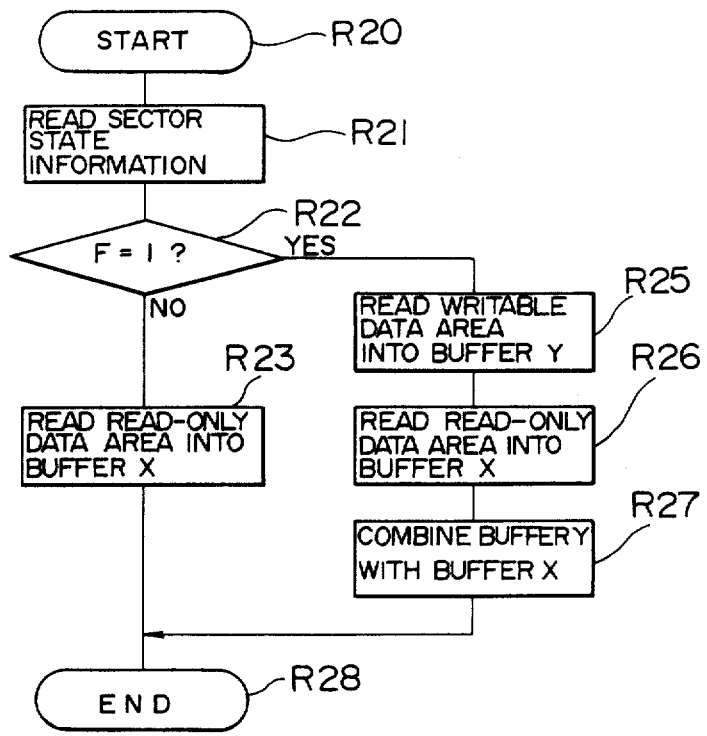
FIGS. 13A and 13B are flowcharts for explaining the operation of the control means on the second sector configuration of FIG. 12.

FIG. 13A: When an information reproducing request from a target sector is issued:

R20 An information reproducing operation is started.

R21: The contents of the sector state information 1021 are read.

R22: If F=1, the operation is shifted to the step R25.

R23: The reproducing means 1002 is instructed to read the information of the read-only data area 1023 into the internal buffer X, and the operation is shifted to the step R18.

R25: The reproducing means 1002 is instructed to read the information of the writable data area 1022 into the internal buffer Y.

R26: The reproducing means 1002 is instructed to read the information of the read-only data area 1023 into the internal buffer X.

R27: The information of the area started at the position A and ended at the position (A+L), the position A is the correction starting position and L is the correction length, in the internal buffer X is replaced by corresponding information in the internal buffer Y.

R28: The information reproducing operation is ended.

Figure 13B:
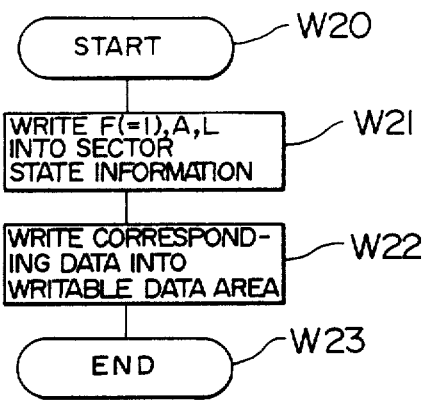

FIG. 13B: When an information recording request onto a target sector is issued:

W20: An information recording operation is started.

W21: F=1, and the information of the correction position A and the correction length L for the read-only data area 1023 are stored into the sector state information 1021.

W22: The recording means 1003 is instructed to write the correction information into the writable data area 1022.

W23: The information recording operation is ended.

For the sake of explanation, in the above embodiments, description has been made such that the contents F of the sector state information 1011 and 1021 are zero, that is, F=0 in the initial condition and can be rewritten. However, the sector state information 1011 and 1021 may be formed with pits so as to be F=0 to thereby make the sector state information to be an entirely read-only one. Although FIGS. 10 and 12 show that the sector 1010 is composed of the sector state information 1011, the writable data area 1012, and the read-only data area 1013 formed in this order, and the sector 1020 is composed of the sector state information 1021, the writable data area 1022, and the read-only data area 1023 formed in this order, respectively, the order of formation of the constituent areas of the respective sector state information is not limited to that illustrated one.

In an information storage medium in which the recording state of information in the writable data area, that is, recorded/not-recorded (erased/recorded) can be judged, the information of "not-renewed"/"already-renewed" in the sector state information may be omitted.

FIG. 14 shows a third example of the configuration of the sector. In FIG. 14, a read-only/writable mixed-area type sector 1110 is composed of a sector identification area 1114, a writable data area 1112, and a read-only data area 1113, while a writable single-area type sector 1120 is composed of a sector identification area 1124 and a writable data area 1122. The sector identification area 1114 and 1124 are provided with sector state information 1111 and 1121 respectively. The contents F of the sector state information 1111 and 1121 may take three values "0", "1" and "2" alternatively, "0" representing the state of "not-renewed" in the read-only/writable mixed-area type sector 1110, "1" representing the state of "already-renewed" in the read-only/writable mixed-area type sector 1110, "2" representing the writable single-area type sector 1120. In the initial state, the contents F take the value of "0" or "2", that is, F=0 or F=2. In the read-only data area 1113, information has been recorded with pits. The quantity of information Srw which can be stored in the writable data area 1112, the quantity of information Sro which can be stored in the read-only data area 1113, and the quantity of Ser which can be stored in the writable data area 1122 are made equal to each other, that is, Srw=Sro=Ser. That is, the read-only/writable mixed-area type sector 1110 and the writable single-area type sector 1120 have their information storage quantities equal to each other apparently. Under the condition, the operation of the control means 1004 will be explained according to the flowcharts of FIGS. 15A and 15B.

Figure 15A:
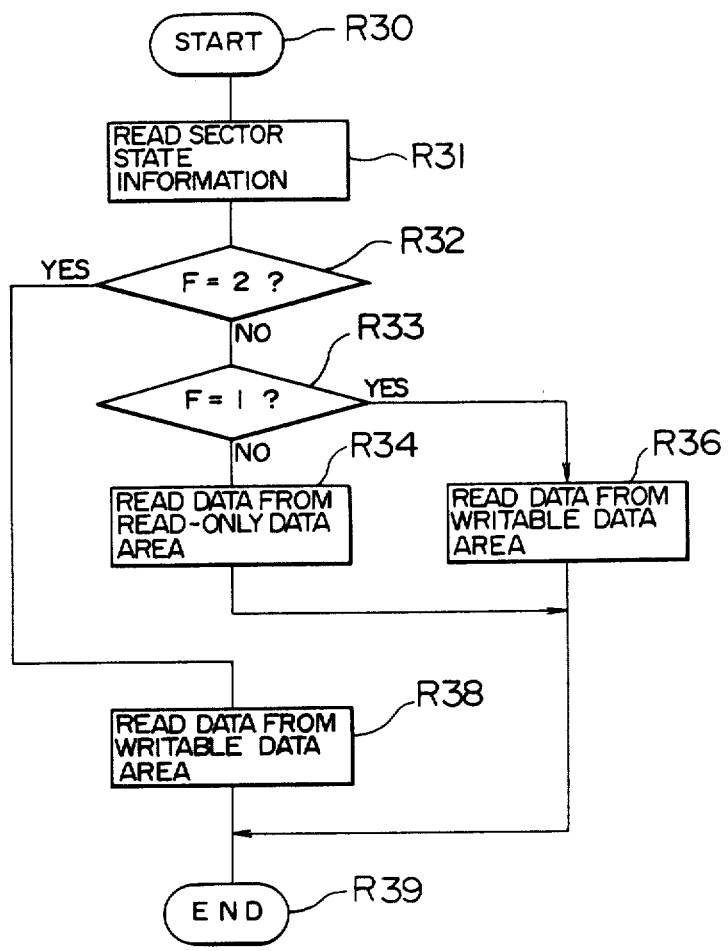
FIGS. 15A and 15B are flowcharts for explaining the operation of the control means on the first sector configuration of FIG. 14.

FIG. 15A: When an information reproducing request from a target sector is issued:

R30: An information reproducing operation is started.

R31: The contents F of the sector state information in the sector is read.

R32: If F=2 (representing the writable single-area type sector), the operation is shifted to the step R38.

R33: If F=1 (representing "already-renewed" in the read-only/writable mixed-area type sector), the operation is shifted to the step R36.

R34 The reproducing means 1002 is instructed to read the information from the read-only data area 1113, and the operation is shifted to the step R39.

R36: The reproducing means 1002 is instructed to read the information from the writable data area 1112, and the operation is shifted to the step R39.

R38: The reproducing means 1002 is instructed to read the information from the writable data area 1122.

R39: The information reproducing operation is ended.

Figure 15B:
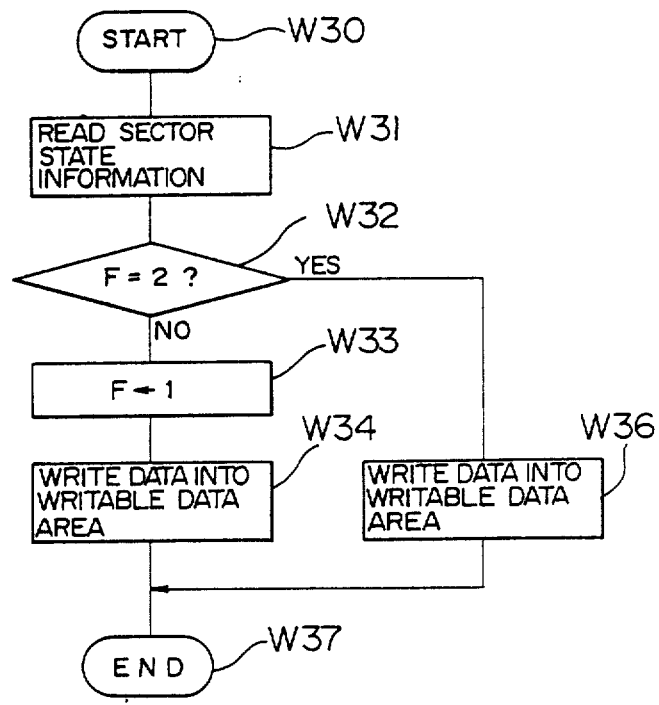

FIG. 15B: When an information recording request onto a target sector is issued:

W30: An information recording operation is started.

W31: The contents F of the sector state information in the sector are read.

W32: If F=2 (representing the writable single-area type sector), the operating is shifted to the step W36.

W33: The contents F of the sector state information 1111 are changed to be F=1 (representing "already-renewed" in the read-only/writable mixed area type sector).

W34: The recording means 1003 is instructed to write the information into the writable data area 1112, and the operation is shifted to the step W37.

W36: The recording means 1003 is instructed to write the information into the writable data area 1112.

W37: The information recording operation is ended.

Figure 16:
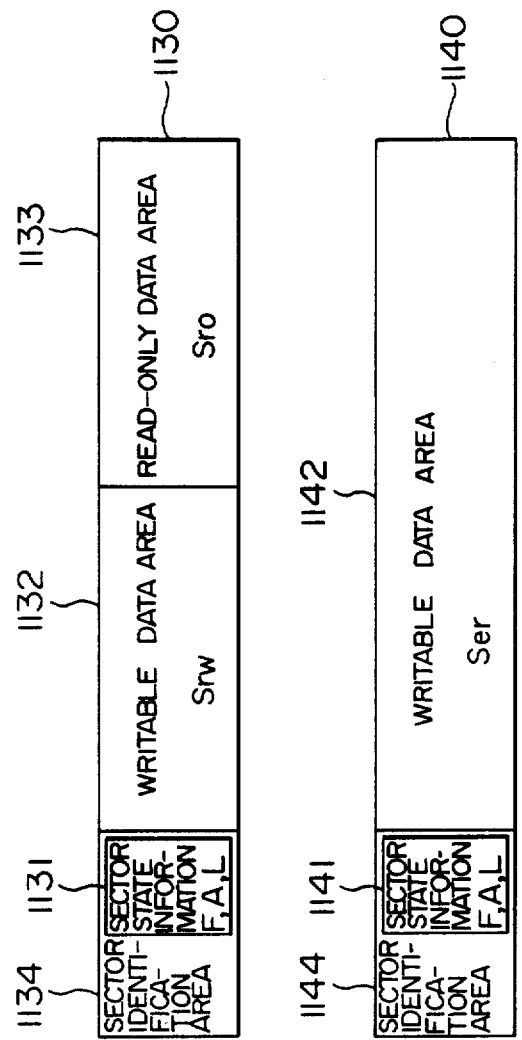
FIG. 16 is a diagram showing a second sector configuration in the fifth embodiment.

FIG. 16 shows a fourth example of the configuration of the sector. In FIG. 16, a read-only/writable mixed-area type sector 1130 is composed of a sector identification area 1134, a writable data area 1132, and a read-only data area 1133, while a writable single-area type sector 1140 is composed of a sector identification area 1144 and a writable data area 1142. The sector identification areas 1134 and 1144 are provided with sector state information 1131 and 1141 respectively. Each of the sector state information 1131 and 1141 has a sector state information F, a correction position A and correction length L. The meaning of the sector state information F is the same as the contents F of the sector state information in the case of FIG. 14. The relation among the quantity of information Srw which can be stored in the writable data area 1132, the quantity of information Sro which can be stored in the read-only data area 1133, the quantity of information Ser which can be stored in the writable data area 1142, and the correction length L are set to satisfy the expression $Srw \leq Sro = Ser$ and $L \leq Srw$. Under the condition, the operation of the control means 1004 will be explained according to the flowcharts of FIGS. 17A and 17B.

Figure 17A:
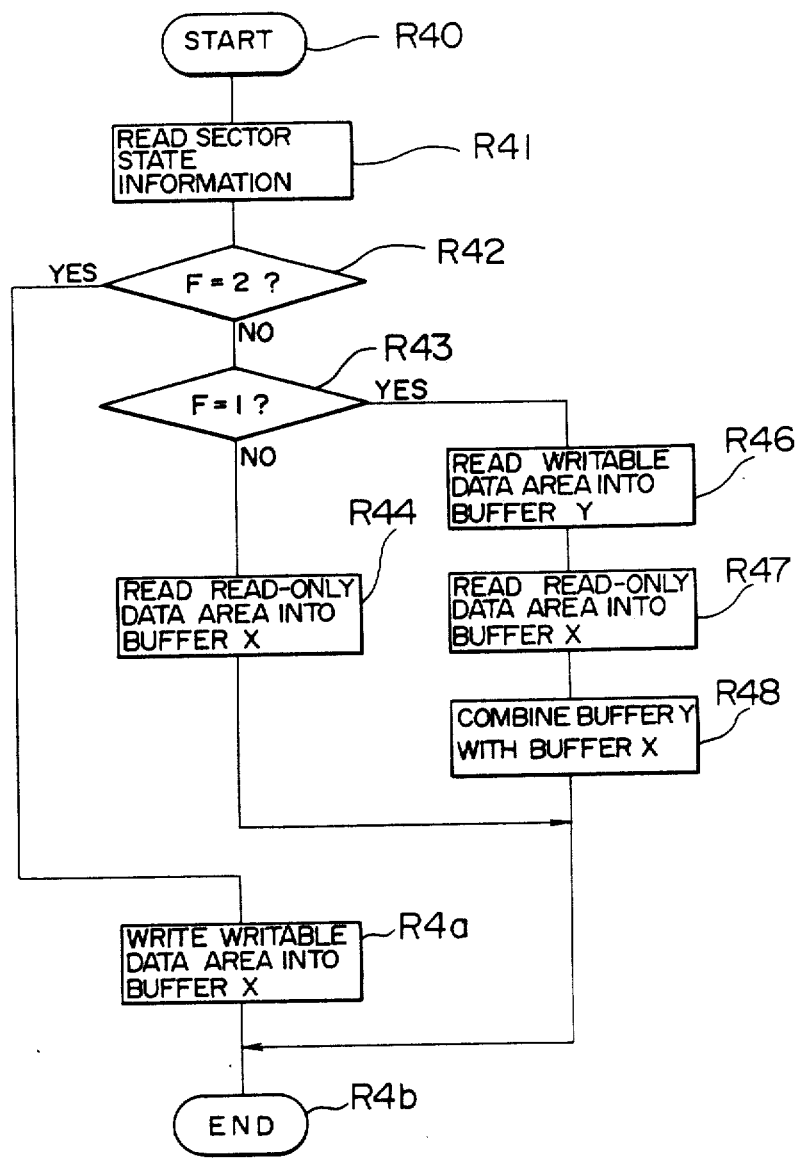

FIG. 17A: When an information reproducing request from a target sector is issued:

R40: An information reproducing operation is started.

R41: The contents of the sector state information in the sector is read.

R42: If F=2 (representing the writable single-area type sector), the operation is shifted to the step R4a.

R43: If F=1 (representing "already-renewed" in the read-only/writable mixed-area type sector), the operation is shifted to the step R46.

R44: The reproducing means 1002 is instructed to read the information from the read-only data area 1133 into the internal buffer X, and the operation is shifted to the step R4b.

R46: The reproducing means 1002 is instructed to read the information from the writable data area 1132 into the internal buffer Y.

R47: The reproducing means 1002 is instructed to read the information from the read-only data area 1133 into the internal buffer X.

R48: The information of the area started at the position A and ended at the position (A+L), the position A is the correction starting position and L is the correction length, in the internal buffer X is replaced by corresponding information in the buffer Y, and the operation is shifted to the step R4b.

R4a: The reproducing means 1002 is instructed to read the information from the writable data area 1142 into the internal buffer X.

R4b: The information reproducing operation is ended.

FIG. 17B: When an information recording request onto a target sector is issued:

W40: An information recording operation is started.

W41: The contents of the sector state information in the sector are read.

W42: If F=2 (representing the writable single-area type sector), the operation is shifted to the step W46.

W43: The contents of the sector state information 1121 are changed to be F=1 (representing "already-renewed" in the read-only/writable mixed-area type sector); and the correction position A and the correction length L for the information for the read-only data area 1023 are stored.

W44: The recording means 1003 is instructed to write the correction information into the writable data area 1132.

W45: The operation is shifted to the step W47.

W46: The recording means 1003 is instructed to write the information into the writable data area 1142.

W47: The information recording operation is ended.

For the sake of explanation, in the above embodiments, description has been made such that the contents F of the sector state information 1111 and 1131 are zero, that is, F=) in the initial condition and can be rewritten. However, the sector state information 111 and 1131 may be formed with pits so as to be F=) to thereby make the sector state information to be entirely read-only information. Further, the contents F of the sector state information 1121 and 1141 are made to be "2", that is, F=2 in the initial condition, and renewal is not done. However, the sector state information 1121 and 1141 may be made to be "3" when information is written, so that the sector state information can be used for the judgement as to "not-recorded"/"recorded". Although FIGS. 14 and 16 show that the read-only/writable mixed-area type sector 1110 is composed of the sector state information 1111, the writable data area 1112, and the read-only data area 1113 formed in this order, and the read-only/writable mixed-area type sector 1130 is composed of the sector state information 1131, the writable data area 1132 and the read-only data area 1133 formed in this order, respectively, the order of formation of the constituent areas of the respective sector state information is not limited to that illustrated one.

Figure 18A:
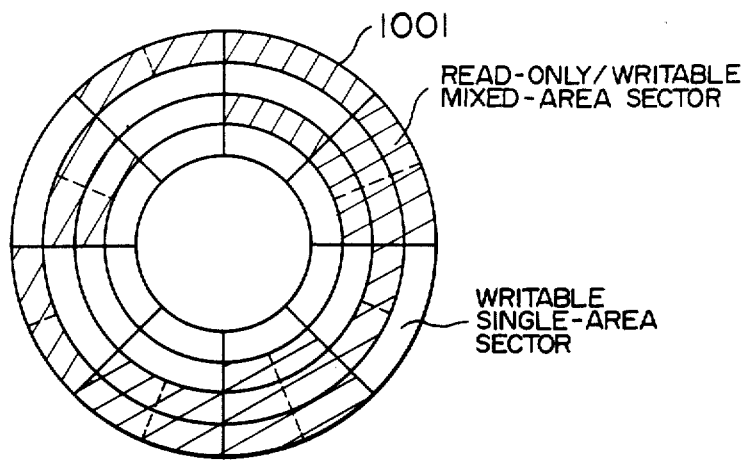
FIGS. 18A and 18B are diagrams for explaining examples of the configuration of the information recording area in the information storage medium.
Figure 18B:
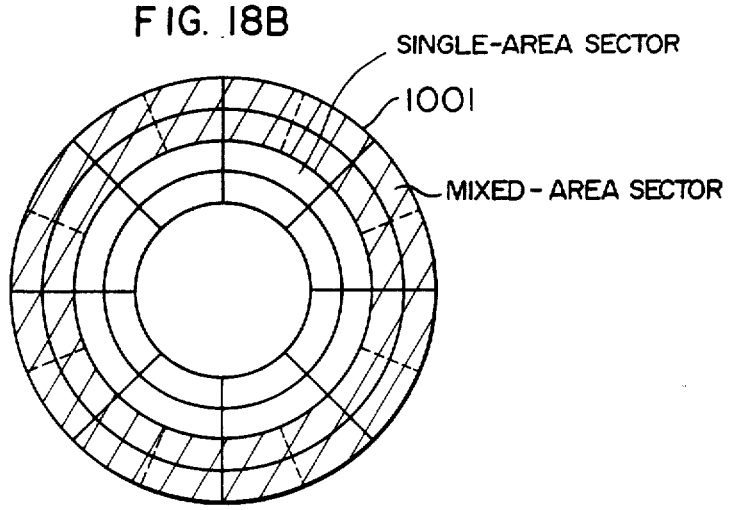

The arrangement of the read-only/writable mixed-area type sectors and the writable single-area type sectors in the contents of the information storage medium 1001 may be scattered as shown in FIG. 18A. However, if the read-only/writable mixed-area type sectors and the writable single-area type sectors are separated from each other with a certain track as a boundary therebetween as shows in FIG. 18B, it is possible to judge whether a sector is of the read-only/writable mixed-area type or of the writable single-area type sector even if each sector identification area has no identification information. Further, if the information storage medium is capable of making a judgement as to "not-recorded"/ "recorded" (="erased"/"recorded") of the information for the writable data area of the read-only/writable mixed-area type sector, it is possible to omit the sector state information.

What is claimed is:

1. An information recording/reproducing apparatus comprising:
   an information storage medium having a plurality of tracks divided into a plurality of sectors of first and second types, a first type sector having a sector identification section, a read/write data section and a read-only data section, and a second type sector having a sector identification section and a read/write data section, said sector identification section of each type sector including a sector type identification flag for identification of the respective sector type and a record state identification flag for identification of record state of the respective type sector as a "not-updated" state or as an "already-updated" state;
   reproducing means for reproducing information from said first and second type sectors;
   recording means for recording information into said first and second type sectors; and
   control means for controlling said reproducing means in an information reproducing mode so that:
   (a) information is reproduced from said read-only data section of a selected said first type sector when a selected first type sector is detected as having a "not-updated" state,
   (b) information is reproduced from said read/write data section of a selected first type sector when a selected first type sector is detected as having an "already-updated" state, and
   (c) information is reproduced from said read-only data data section of a selected second type sector when said second type sector is detected;
   said control means controlling said recording means in an information recording mode so as to change information in said sector identification section of a selected first type sector into information representing a "first type sector" and an "already-updated" state and to record information into said read/write data section of a selected first type sector when the information in the sector identification section thereof represents the "first type sector", and to record information into said read/write data section in a selected second type sector when the information in said sector identification section of a selected second type sector represents the "second type sector".

2. An information recording/reproducing apparatus comprising:
   an information storage medium having a recording material thereon, said storage medium being provided with a plurality of tracks, each divided into a plurality of sectors, said plurality of sectors including a plurality of sectors of a first type which have a read only data section having information prerecorded therein and a read/write data section for updating data contained in said read only data section;
   reproducing means for reproducing sector data from information recorded on said read only data section and said read/write data section in said plurality of sectors of said first type;
   recording means for recording information into said read/write data section of said plurality of sectors of said first type; and
   control means for controlling the reproduction of information from, or the recording of information into, a selected on of said first type sectors based on whether a selected sector is in a "not-updated" state or an "already-updated" state, said control means checking a state of a selected sector and controlling said reproducing means and said recording means such that:
   (a) information is reproduced only from said read-only section of a selected sector if said selected sector is in a "not-updated" state, and information is reproduced from only said read/write data section, or from said read/write data section and said read only data section of said selected sector if said selected sector is in an "already-updated" state; and
   (b) information for updating the data in said read only data section is recorded into said read/write section of said selected sector at the time of updating the information.

3. An apparatus according to claim 2 wherein said plurality of sectors includes a plurality of sectors or a second type which have a read/write data section and no read only data section and a sector type identification section, said sectors of the first type also having a sector type identification section, said sector type identification section of each of said first and second types of sectors containing a sector type identification flag for indicating whether a sector is of the first or second type, said apparatus further comprising:
   sector type identification flag detecting means for detecting the sector type identification flag;
   said control means including means responsive to the output of said sector type identification flag detecting means for determining whether said selected sector is of said first type or second type and in response thereto for controlling said reproducing means and said recording means such that in accordance with the type of said selected sector;
   (a) information is reproduced from said read-only data section of said selected sectors of said first type and information is recorded or reproduced to and from said read/write data section of said selected sector of said first type; and
   (b) information is recorded or reproduced to ro from said read/write data section of a selected sector of said second type.

4. An apparatus according to claim 2 wherein the read/write section of each sector of said first type includes a record state identification flat for identifying said recording state as one of a "not-updated" state or an "already-updated" state, said apparatus further comprising:

means for detecting the record state identification flag, said control means being responsive to said means for detecting the record state identification flag.

5. An apparatus according to claim 2 wherein the read/write section of each sector of said first type includes: (a) a sector identification flag area having recorded therein the record state identification flag and (b) a substitutive sector address area having recorded therein an address indicating a sector to be read in substitution for said read only data section of said first type of sector, and wherein said control means includes means for detecting the record state identification flag and controlling said recording and reproducing means such that;
 (a) information is reproduced from a read only data section of a selected sector of the first type when a "not-updated" state is detected;
 (b) substitutive sector address is reproduced from said substitutive sector address area and information from substitute sector identified by said substitutive sector address is reproduced when an "already-updated" state is detected for a selected sector of said first type; and
 (c) a record state identification flag is recorded into said sector identification flag area of a selected sector of said first type and a substitutive sector address is recorded into said substitutive sector address area of a selected sector of said first type.

6. An apparatus according to claim 4 wherein said read/write data section of each sector of said first type includes: (a) a sector identification flag area having recorded therein a record state identification flag and (b) a substitutive data area for data substitution for said read only data section thereof, and wherein said control means includes means for detecting said record state identification flag of said first type sector and controlling said recording and reproducing means such that:
 (a) information is reproduced from the read only data section of a selected sector of the first type when the "not-updated" state is detected;
 (b) information is reproduced form the substitutive data area of a selected sector of the first type when the "already-updated" state is detected; and
 (c) the record state identification flag is recorded into said sector identification flag area of a selected sector of the first type and substitutive data is recorded into said substitutive data area of a selected sector of the first type.

7. An apparatus according to claim 2 wherein the read/write section of each sector of said first type includes a validity/invalidity identification flag for identification of validity or invalidity of the read-only data section and wherein said control means includes means for detecting said validity/invalidity identification flag in a selected sector of said first type and controlling said recording and reproducing means such that:
 (a) information is reproduced form the read-only data section of a selected sector of the first type when validity is detected, and is not reproduced form the read-only data section of a selected sector of the first type when invalidity is detected, and
 (b) the sector data validity/invalidity identification flag is recorded into the read/write data section of a selected sector of said first type.

8. An apparatus according to claim 3 wherein the read/write section of each sector of said first type includes a data recording area, a sector identification flag area and a substitutive sector address area, said sector identification flag area having a record state flag for identification of a record state of said substitutive sector address area as one of a "not-updated" or "already updated" state, said substitute sector address area being recorded with an address of a substitutive sector, and wherein said control means includes means for detecting said record state flag and controlling said recording and reproducing means such that:
 (a) data is recorded into the data recording area of said read/write data section of a selected sector of said second type,
 (b) information is reproduced from said data recording area of a selected sector of said second type when a "not-updated" state is detected, while information is reproduced from said substitutive sector designated by the address of said substitutive sector address area of a selected sector of the second type when an "already-updated" state is detected, and
 (c) a said record state flag is recorded into said sector identification flag area of a selected sector of the second type, and the address of said substitutive sector is recorded into said substitutive sector address area of a selected sector of said second type.

9. An apparatus according to claim 3, wherein said read/write section of each sector of said second type includes a recorded data area and a sector identification flag area for storing a validity/invalidity identification flag for identification of validity or invalidity of data in said recorded data area, and wherein said control means includes means for detecting said validity/invalidity identification flag and controlling said recording and reproducing means such that:
 (a) information is reproduced in said recorded data area of said read/write data section of a selected sector of the second type,
 (b) information is reproduced from said recorded data area of a selected sector of the second type when a validity state is detected from said validity/invalidity identification flag and information is not reproduced from said recorded data area when an invalidity state is detected from said validity/invalidity identification flag, and
 (c) said validity/invalidity identification flag is recorded into said sector identification flag area of a selected sector of the second type.

* * * * *